(12) United States Patent
Cordell et al.

(10) Patent No.: US 11,027,465 B2
(45) Date of Patent: Jun. 8, 2021

(54) METHODS FOR FORMING ROTOR BLADES HAVING FOAM CORES

(71) Applicant: Bell Helicopter Textron Inc., Fort Worth, TX (US)

(72) Inventors: James A. Cordell, Azle, TX (US); Suvankar Mishra, Carrollton, TX (US); Andrew Paul Haldeman, Fort Worth, TX (US); Jesse J. Wrabel, Fort Worth, TX (US); Dalton T. Hampton, Fort Worth, TX (US)

(73) Assignee: TEXTRON INNOVATIONS INC., Fort Worth, TX (US)

( * ) Notice: Subject to any disclaimer, the term of this patent is extended or adjusted under 35 U.S.C. 154(b) by 561 days.

(21) Appl. No.: 16/141,127

(22) Filed: Sep. 25, 2018

(65) Prior Publication Data
US 2020/0094450 A1    Mar. 26, 2020

(51) Int. Cl.
| | |
|---|---|
| *B29C 44/18* | (2006.01) |
| *B64C 11/26* | (2006.01) |
| *B29C 44/34* | (2006.01) |
| *B29C 44/60* | (2006.01) |
| *B29C 44/42* | (2006.01) |
| *B29L 31/08* | (2006.01) |
| *B64C 27/473* | (2006.01) |

(52) U.S. Cl.
CPC .......... *B29C 44/18* (2013.01); *B29C 44/3415* (2013.01); *B29C 44/422* (2013.01); *B29C 44/60* (2013.01); *B64C 11/26* (2013.01); *B29L 2031/082* (2013.01); *B29L 2031/087* (2013.01); *B64C 2027/4736* (2013.01); *F05D 2300/612* (2013.01)

(58) Field of Classification Search
CPC ... B29C 44/18; B29C 44/3415; B29C 44/422; B29C 44/425; B29C 44/60; B29C 11/26; B29C 11/24; B29C 11/16; B29C 2027/4733; B29C 45/00; B29C 2045/1653; B29C 44/1223; B29C 44/1228; B29C 44/1233; B29C 45/1735; B29C 48/36
See application file for complete search history.

(56) References Cited

U.S. PATENT DOCUMENTS 4,268,571 A  *  5/1981  McCarthy ............. B29C 70/085
                                                           264/46.6

OTHER PUBLICATIONS

J6 Polymers LLC, JFOAM™ BX-450 Product Bulletin, date unknown, 2 pages.

* cited by examiner

*Primary Examiner* — Stella K Yi
(74) *Attorney, Agent, or Firm* — Patent Capital Group

(57) ABSTRACT

A method is provided in one example embodiment and may include positioning at least one nozzle within a hollow portion of a rotor blade at a distance associated with a span of the rotor blade and providing, via the at least one nozzle, a liquid foam mixture in the hollow portion, wherein the liquid foam expands and becomes a solid foam material that fills the hollow portion of the rotor blade. Another method is provided in another example embodiment and may include providing a plurality of openings for a rotor blade that are positioned proximate to a hollow portion of the rotor blade and providing a liquid foam mixture in the hollow portion of the rotor blade through at least one opening of the rotor blade, wherein the liquid foam mixture expands and becomes a solid foam material that fills the hollow portion of the rotor blade.

26 Claims, 19 Drawing Sheets

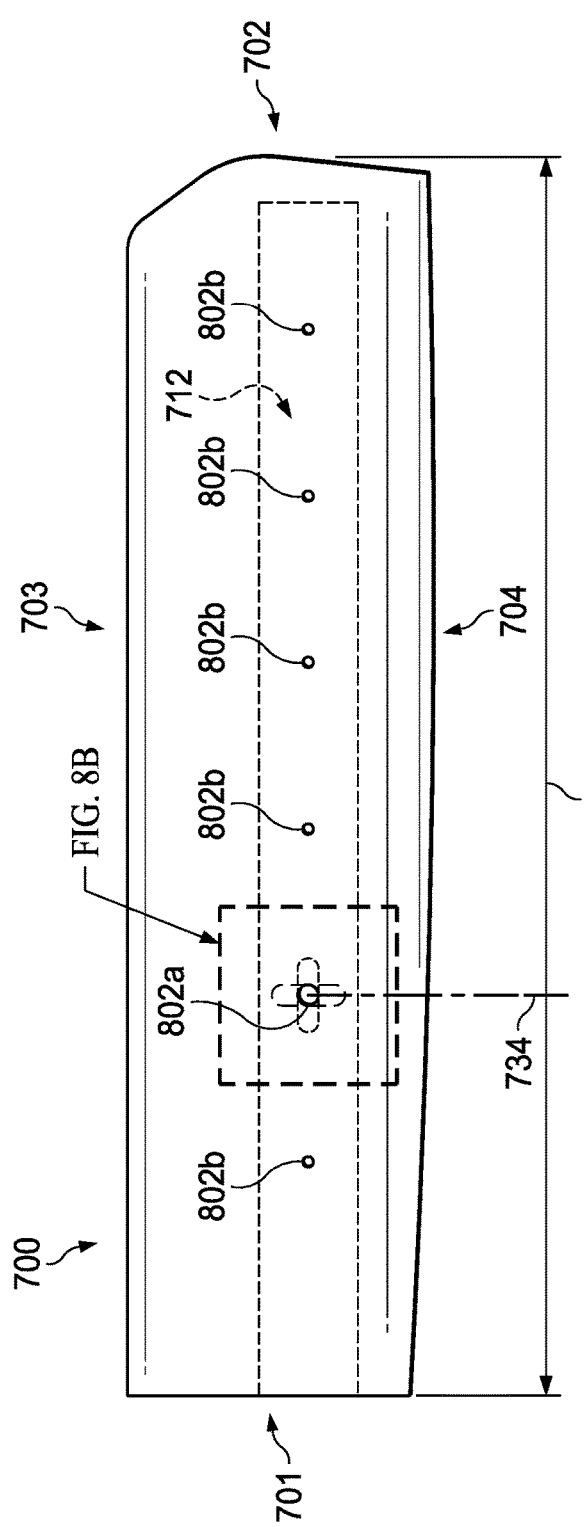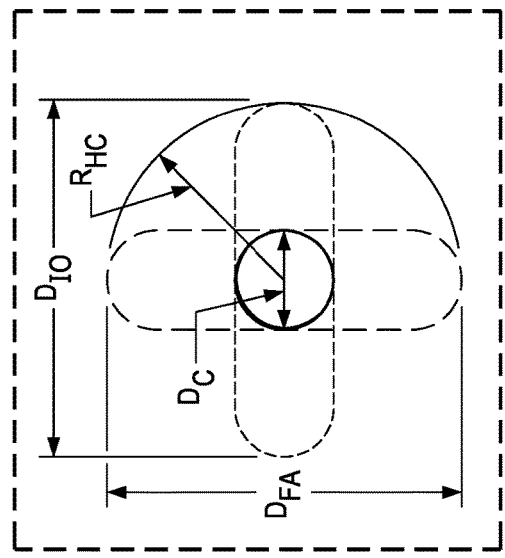
FIG. 8A
FIG. 8B

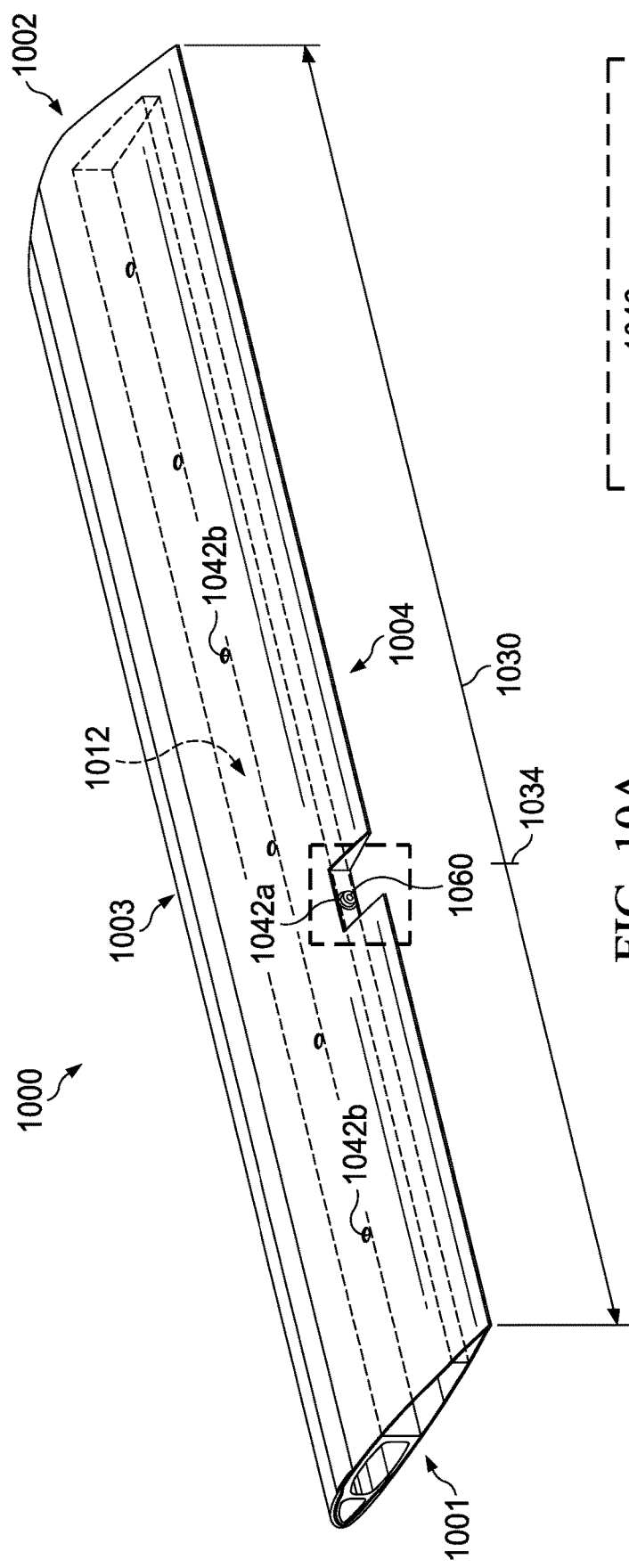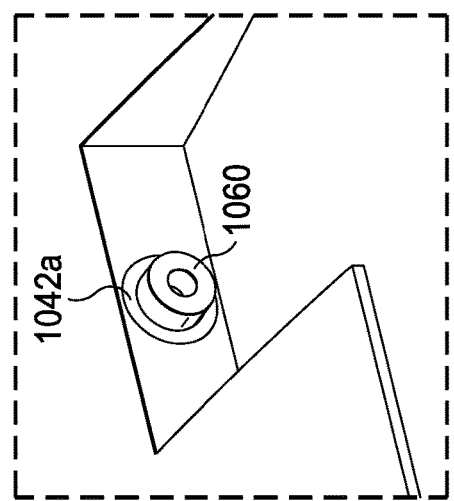
FIG. 10A
FIG. 10B

METHODS FOR FORMING ROTOR BLADES HAVING FOAM CORES

TECHNICAL FIELD

This disclosure relates in general to the field of aircraft and, more particularly, though not exclusively, to methods for forming rotor blades having pourable/injected foam cores.

BACKGROUND

There are numerous considerations involved in the design and manufacture of components for aircraft, such as tiltrotor aircraft and rotorcraft, including size, weight, power efficiency, fuel efficiency, noise, vibration, structural loads, and so forth. For example, manufacturing processes for rotor blades is often extremely challenging and can implicate numerous considerations which may impact the ability to manufacture rotor blades in a cost and/or time efficient manner.

SUMMARY

According to one aspect of the present disclosure, a method may be provided and may include positioning at least one nozzle within a hollow portion of a rotor blade at a distance associated with a span of the rotor blade, wherein the hollow portion of the rotor blade has a fixed volume between an outboard end and an inboard end of the rotor blade; and providing, via the at least one nozzle, a liquid foam mixture in the hollow portion, wherein the liquid foam expands and becomes a solid foam material that fills the hollow portion of the rotor blade. The hollow portion of the rotor blade may be defined defined, at least in part, by an aft wall of a spar of the rotor blade, at least a portion of an inner surface of an upper skin of the rotor blade, at least a portion of an inner surface of a lower skin of the rotor blade, and a forward wall of a trailing edge wedge of the rotor blade for the span of the rotor blade. In at least one instance, the distance at which the nozzle is positioned within the hollow portion of the rotor blade may be based, at least in part, on a center of the fixed volume of the hollow portion of the rotor blade. The solid foam material may adhere to an upper skin of the rotor blade, a lower skin of the rotor blade, a spar of the rotor blade, and a trailing edge wedge of the rotor blade.

In various instances providing the liquid foam mixture in the hollow portion may include at least one of: moving the rotor blade away from the at least one nozzle at one or more at one or more rates as the liquid foam mixture is provided in the hollow portion of the rotor blade; removing the at least one nozzle from the hollow portion at one or more rates as the liquid foam mixture is provided in the hollow portion of the rotor blade; adjusting a flow rate that the liquid foam mixture is provided in the hollow portion of the rotor blade; tilting the rotor blade along an inboard-outboard axis as the liquid foam mixture is provided in the hollow portion of the rotor blade; and tilting the rotor blade along a forward-aft axis during as the liquid foam mixture is provided in the hollow portion of the rotor blade. In some instances, the method may include providing at least one opening for the hollow portion of the rotor blade to allow outgassing as the liquid foam mixture expands and becomes the solid foam material.

In some instances, tilting the rotor blade along the inboard-outboard axis may include tilting the outboard end of the rotor blade downward between 15 degrees and 75 degrees. In still some instances, tilting the rotor blade along the forward-aft axis may include tilting a leading edge of the rotor blade downward between 15 degrees and 75 degrees. In still some instances, providing the liquid foam mixture in the hollow portion may include one of heating the liquid foam mixture; and cooling the liquid foam mixture. Heating the liquid foam mixture may include heating the liquid foam mixture to a temperature greater than 100 degrees Fahrenheit. Cooling the liquid foam mixture may include cooling the liquid foam mixture to a temperature less than 70 degrees Fahrenheit.

In some instances the distance may be one of a plurality of distances associated with the span of the rotor blade, and providing the liquid foam mixture may further include providing the liquid foam mixture in the hollow portion between the outboard end and the inboard end of the rotor blade at each distance of the plurality of distances, wherein the position of the at least one nozzle at each distance is maintained for a period of time and wherein the period of time at each distance is the same or different.

According to another aspect of the present disclosure, another method may be provided and may include providing a plurality of openings for a rotor blade, wherein the plurality of openings are positioned proximate to a hollow portion of the rotor blade, and the hollow portion of the rotor blade has a fixed volume between an outboard end and an inboard end of the rotor blade; and providing a liquid foam mixture in the hollow portion of the rotor blade through at least one opening of the plurality of openings of the rotor blade, wherein the liquid foam mixture expands and becomes a solid foam material that fills the hollow portion of the rotor blade.

In some instances, providing the liquid foam mixture in the hollow portion of the rotor blade may include pouring the liquid foam mixture into the hollow portion using at least one opening of the plurality of openings. In some instances, the at least one opening of the plurality of openings may have an inboard-outboard diameter and a forward-aft diameter in which the inboard-outboard diameter and the forward-aft diameter are different.

In some instances, the liquid foam mixture may be provided into the hollow portion of the rotor blade at a particular opening located at a distance that is based, at least in part, on a center of the fixed volume of the hollow portion rotor blade between the outboard end and the inboard end of the rotor blade. In some instances, the fixed volume of the rotor blade may include a plurality of sub-volumes and the liquid foam mixture may be provided into the hollow portion of the rotor blade at a plurality of openings, wherein each opening is located at a distance that is based, at least in part, on a center of each sub-volume.

In various instances, providing the liquid foam mixture in the hollow portion of the rotor blade may include at least one of: tilting the rotor blade along an inboard-outboard axis as the liquid foam mixture is provided in the hollow portion of the rotor blade; and tilting the rotor blade along a forward-aft axis during as the liquid foam mixture is provided in the hollow portion of the rotor blade.

In still some instances, providing the liquid foam mixture in the hollow portion of the rotor blade may include injecting the liquid foam mixture through at least one opening of the plurality of openings using a foam delivery system, wherein the liquid foam mixture is injected through the at least one opening at one or more flow rates. The at least one opening may be located at one of: an inboard end of the rotor blade; an upper skin of the rotor blade; a lower skin of the rotor blade; and a trailing edge of the rotor blade. In various instances, the injecting may further include at least one of tilting the rotor blade along an inboard-outboard axis as the liquid foam mixture is injected; and tilting the rotor blade along a forward-aft axis during as the liquid foam mixture is injected. In still some instances, the injecting may further include one of heating the liquid foam mixture prior to the injecting; and cooling the liquid foam mixture prior to the injecting. At least one opening of the plurality of openings may allow outgassing as the liquid foam mixture expands and becomes the solid foam material. In some instances at least one opening may be provided through a skin of the rotor blade and/or at least one opening may be provided through a trailing edge of the rotor blade.

The method may further include sealing the plurality of openings of the rotor blade after the liquid foam mixture expands and becomes the solid foam material. In some instances, the plurality of openings may be sealed using a composite material.

In at least one instance the hollow portion of the rotor blade may be defined, at least in part, by an aft wall of a spar of the rotor blade, at least a portion of an inner surface of an upper skin of the rotor blade, at least a portion of an inner surface of a lower skin of the rotor blade, and a forward wall of a trailing edge wedge of the rotor blade for a span of the rotor blade. The solid foam material may adhere to an upper skin of the rotor blade, a lower skin of the rotor blade, a spar of the rotor blade, and a trailing edge wedge of the rotor blade.

According to another aspect of the present disclosure a rotor blade may be provided and may include an upper skin and a lower skin; at least one spar between the upper skin and the lower skin; a core area between the upper skin and the lower skin and between the at least one spare and a trailing edge of the rotor blade; and a foam material in the core area, wherein the foam material is provided in the core area after the upper skin and the lower skin are bonded to the at least one spar. The foam material may be provided in the core area as a liquid foam mixture that converts to a solid foam material that fills the core area and adheres to components that that define the core area. In some instances, the rotor blade may further include a trailing edge wedge, wherein the upper skin and lower skin are bonded to the at least one spar and the trailing edge wedge, and the foam material is provided in the core area after the upper skin and the lower skin are bonded to the at least one spar and the trailing edge wedge.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

FIGS. 8A-8D are simplified diagrams illustrating example details that may be associated with providing a liquid foam mixture in a core area of a rotor blade, in accordance with certain embodiments.

FIGS. 10A-10B are simplified diagrams illustrating example details that may be associated with another example rotor blade, in accordance with certain embodiments.

DETAILED DESCRIPTION

Figure 1A:
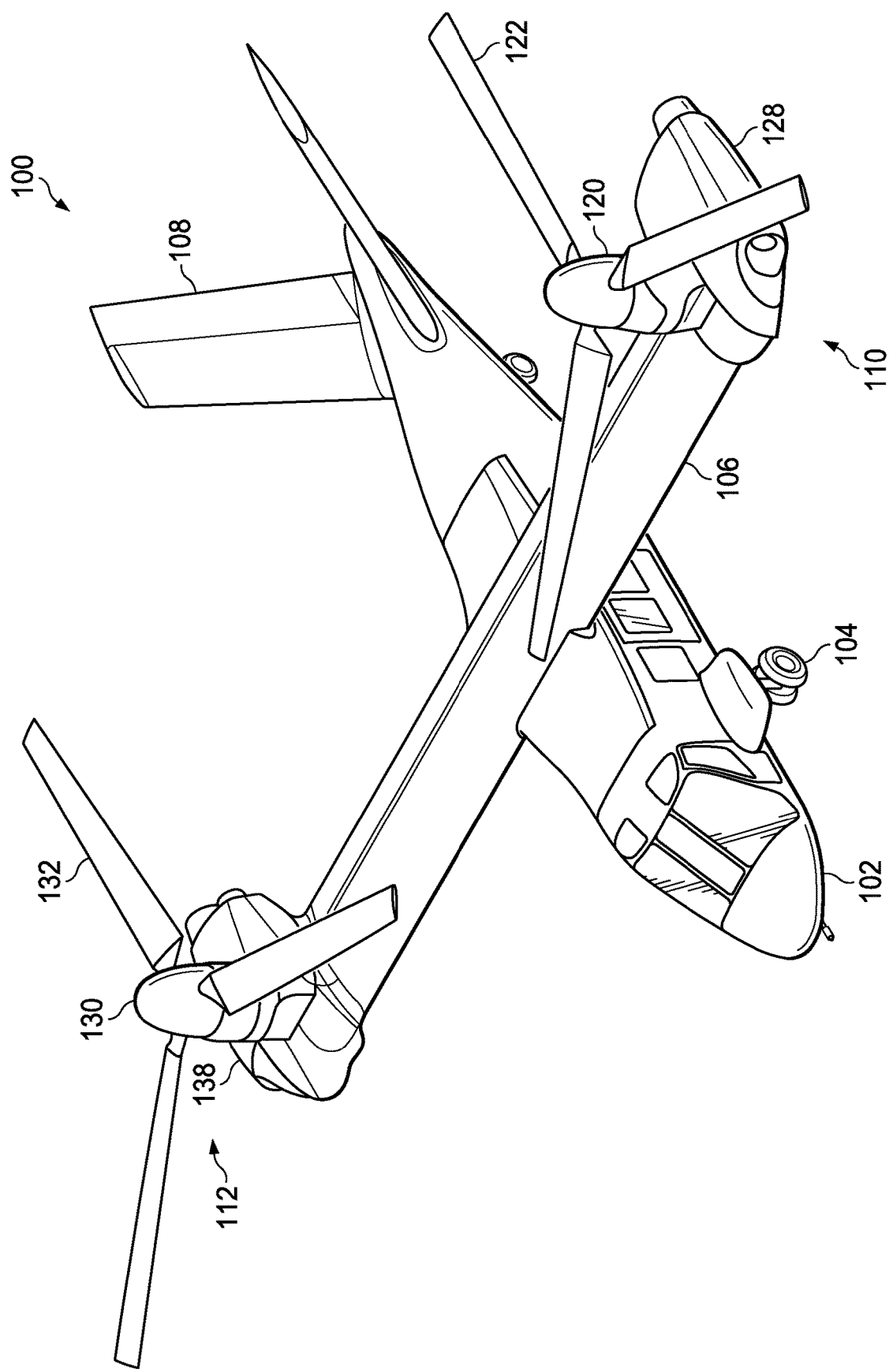
FIGS. 1A-1B and 2 are simplified schematic diagrams of example aircraft, in accordance with certain embodiments.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as 'above', 'below', 'upper', 'lower', 'top', 'bottom', or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, length, temperature) of an element, operations, and/or conditions, the phrase 'between X and Y' represents a range that includes X and Y.

Additionally, as referred to herein in this Specification, the terms 'forward', 'aft', 'inboard', and 'outboard' may be used to describe relative relationship(s) between components and/or spatial orientation of aspect(s) of a component or components. The term 'forward' may refer to a spatial direction that is closer to a front of an aircraft relative to another component or component aspect(s). The term 'aft' may refer to a spatial direction that is closer to a rear of an aircraft relative to another component or component aspect(s). The term 'inboard' may refer to a location of a component that is within the fuselage of an aircraft and/or a spatial direction that is closer to or along a centerline of the aircraft (wherein the centerline runs between the front and the rear of the aircraft) or other point of reference relative to another component or component aspect. The term 'outboard' may refer to a location of a component that is outside the fuselage of an aircraft and/or a spatial direction that farther from the centerline of the aircraft or other point of reference relative to another component or component aspect.

Figure 1B:
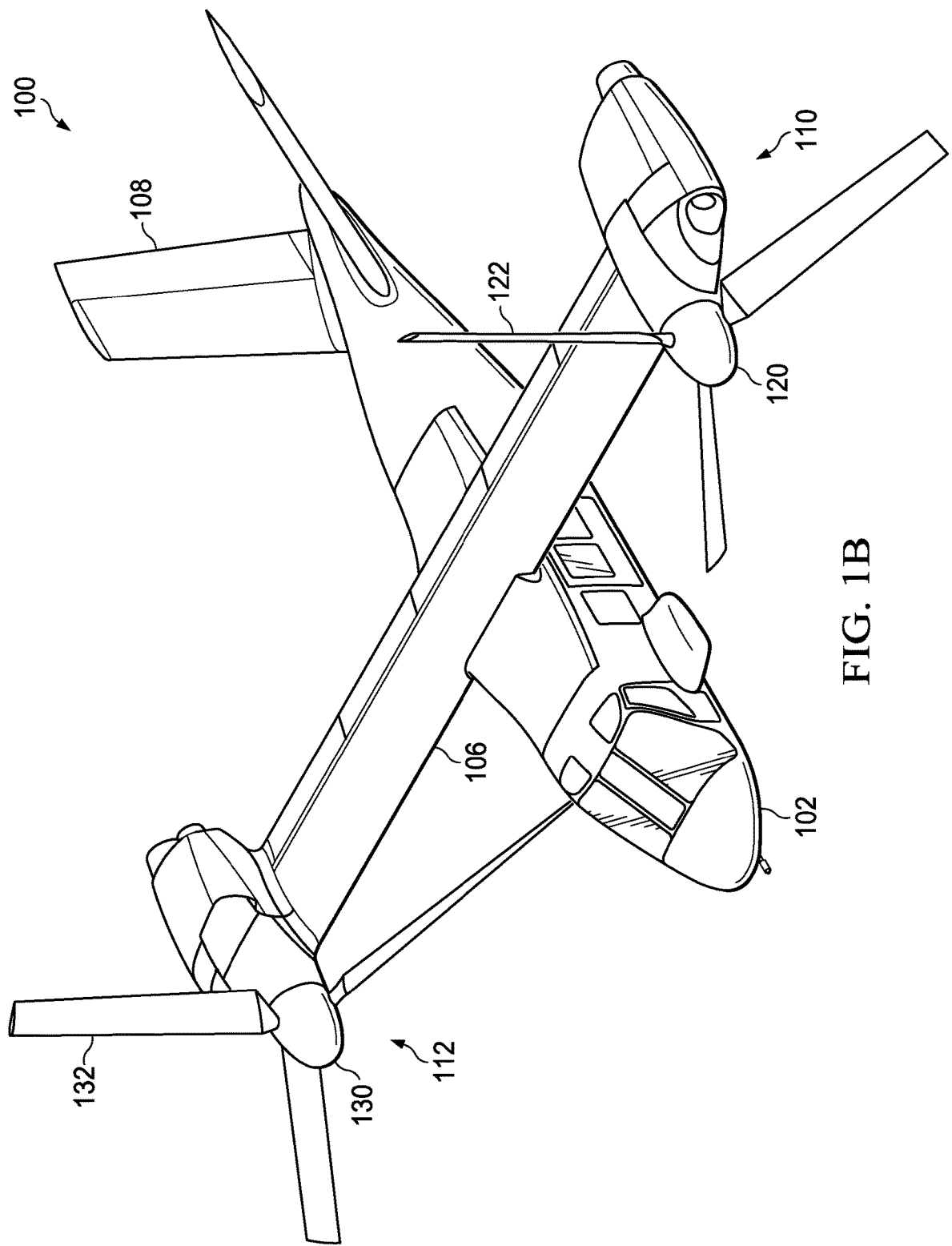

For convenience, the phrase 'FIG. 1'' may be used to refer to the collection of drawings of FIGS. 1A-1B, the phrase "FIG. 3" may be used to refer to the collection of drawings of FIGS. 3A-3E, etc. Although certain elements may be referred to in the singular herein, such elements may include multiple sub-elements. For example, 'a solid foam material" may include one or more solid foam materials formed using one or more methods described herein. Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Referring to FIGS. 1A-1B, FIGS. 1A-1B illustrate perspective views of an example aircraft, which in this example is a tiltrotor aircraft 100. Tiltrotor aircraft 100 includes a fuselage 102, a landing gear 104, a wing 106, a tail member 108, a propulsion system 110, and a propulsion system 112. The fuselage 102 is the main body of the tiltrotor aircraft 100, which may include a cabin (e.g., for crew, passengers, and/or cargo) and/or may house certain mechanical and electrical components for tiltrotor aircraft 100. In the illustrated embodiment, tail member 108 may be used as a vertical and a horizontal stabilizer.

Propulsion system 110 includes a proprotor 120 that includes a plurality of rotor blades 122. Propulsion system 112 includes a proprotor 130 that includes a plurality of rotor blades 132. Various engine(s), gearbox(es), and drive shaft (s) may be provided in various configurations to provide torque to proprotors 120 and 130. For example, in at least one embodiment, propulsion system 110 may include an engine (not shown) within a nacelle 128 that is mechanically connected to a one or more gearbox(es) (also not shown) to provide torque to proprotor 120 and propulsion system 112 may include an engine (not shown) within a nacelle 138 that is mechanically connected to one or more gearbox(es) (also not shown) to provide torque to proprotor 130 to provide flight capabilities (e.g., flight direction, thrust, and/or lift) for tiltrotor aircraft 100. The position or proprotors 120 and 130, as well as the pitch of rotor blades 122 and 132, can be selectively controlled in order to selectively control direction, thrust, and/or lift of tiltrotor aircraft 100.

For example, the position of proprotors 120 and 130 are moveable between a helicopter mode and an airplane mode to provide different types of thrust for tiltrotor aircraft 100. FIG. 1A illustrates tiltrotor aircraft 100 in helicopter mode in which proprotors 120 and 130 are positioned substantially vertical to provide a lifting thrust. FIG. 1B illustrates tiltrotor aircraft 100 in an airplane mode in which proprotors 120 and 130 are positioned substantially horizontal to provide a forward thrust in which a lifting force is supplied by wing 106.

Figure 2:
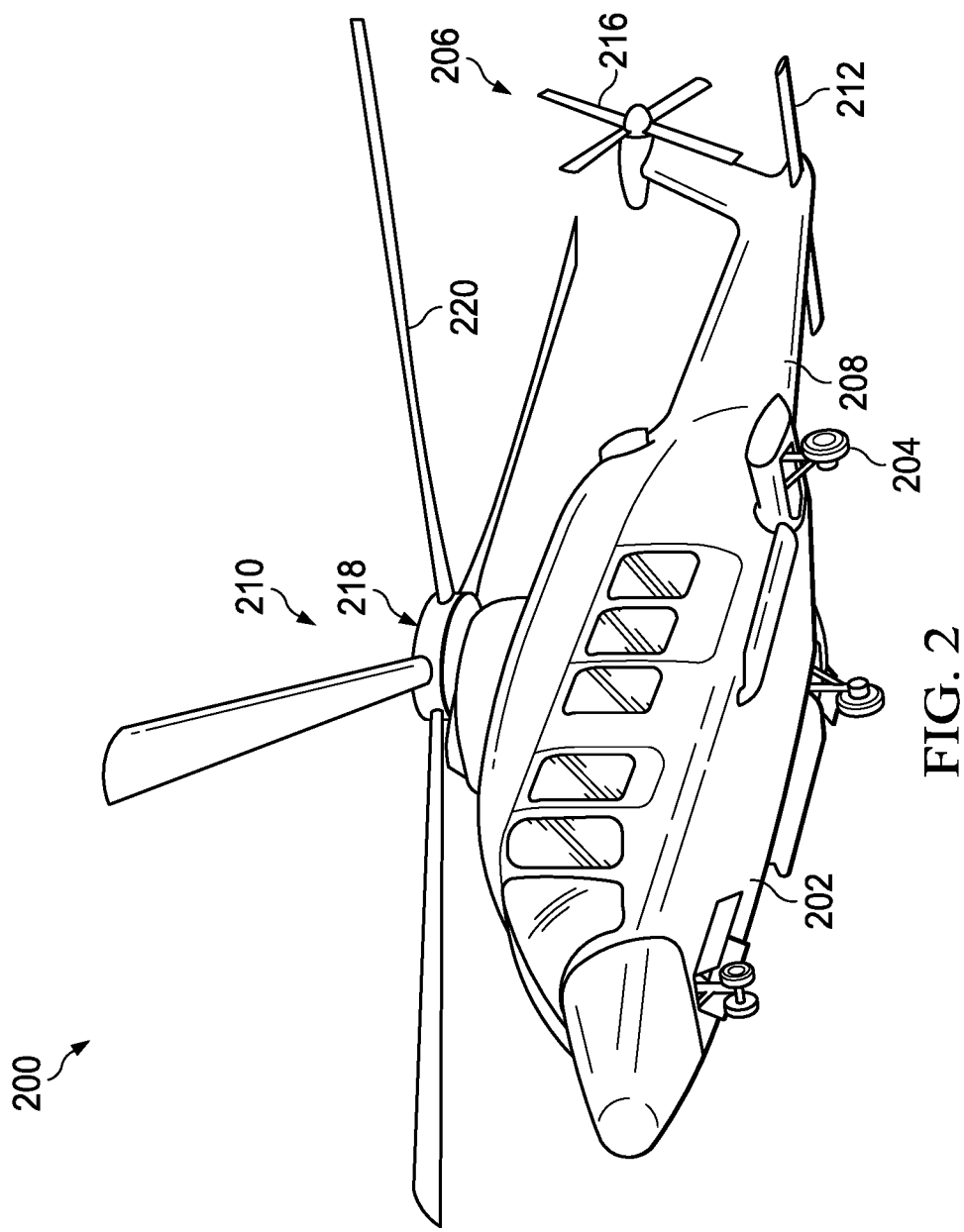

Referring to FIG. 2, FIG. 2 illustrates a side view of an example aircraft, which in this example is a rotorcraft 200. Rotorcraft 200 includes a propulsion system 210, a fuselage 202, a landing gear 204, a tail rotor or anti-torque system 206, an empennage 208, and a tail structure 212. Anti-torque system 206 may include rotor blades 216. Propulsion system 210 may include one or more engines (not shown) that is/are mechanically connected to a main rotor gearbox (not shown) to provide torque to a rotor system 218 that includes rotor blades 220 and also to provide torque to anti-torque system 206. The pitch of each rotor blade 218 can be managed or adjusted in order to selectively control direction, thrust, and lift of rotorcraft 200. The fuselage 202 is the main body of the rotorcraft, which may include a cabin (e.g., for crew, passengers, and/or cargo) and/or may house certain mechanical and electrical components (e.g., engine(s), transmission, and/or flight controls). In the illustrated embodiment, tail structure 212 may be used as a horizontal stabilizer.

In some cases, various components of tiltrotor aircraft 100 and/or rotorcraft 200 may be made from composite materials. For example, rotor blades 122 and 132 of tiltrotor aircraft 100 and/or rotor blades 216 and 220 of rotorcraft 200 may be made of composite materials. A composite material is a combination of different materials integrated together to achieve certain structural and/or design properties. Stated differently, a composite material may be a combination of at least two different materials that, when they are in close proximity and function in combination with each other, enhance the capabilities that either material may possess alone. Composite materials can be integrated together to form three-dimensional composite structures, such as rotor blades. The properties of a three-dimensional composite structure are typically superior to the properties of the underlying materials individually. For example, certain composite materials may be lightweight yet relatively strong, rendering them particularly suitable for aircraft and other applications where weight and/or strength are critical to performance. In some cases, components may be made from fiber reinforced composite materials such as carbon fiber reinforced polymers (CFRPs), boron fiber reinforced composites, combinations thereof, or the like.

Figure 3A:
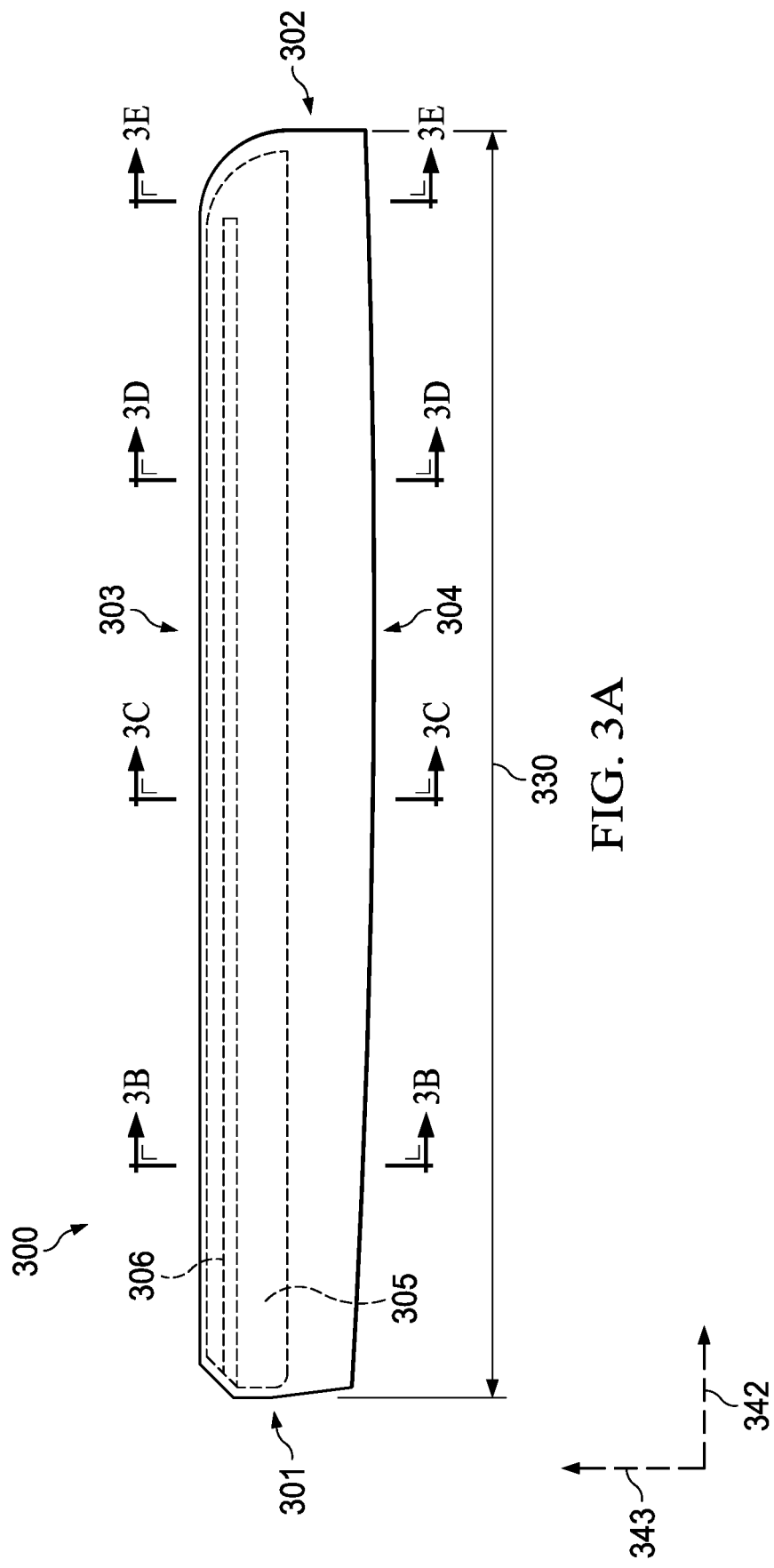
FIGS. 3A-3E are simplified diagrams illustrating example details that may be associated with a rotor blade, in accordance with certain embodiments.
Figure 3B:
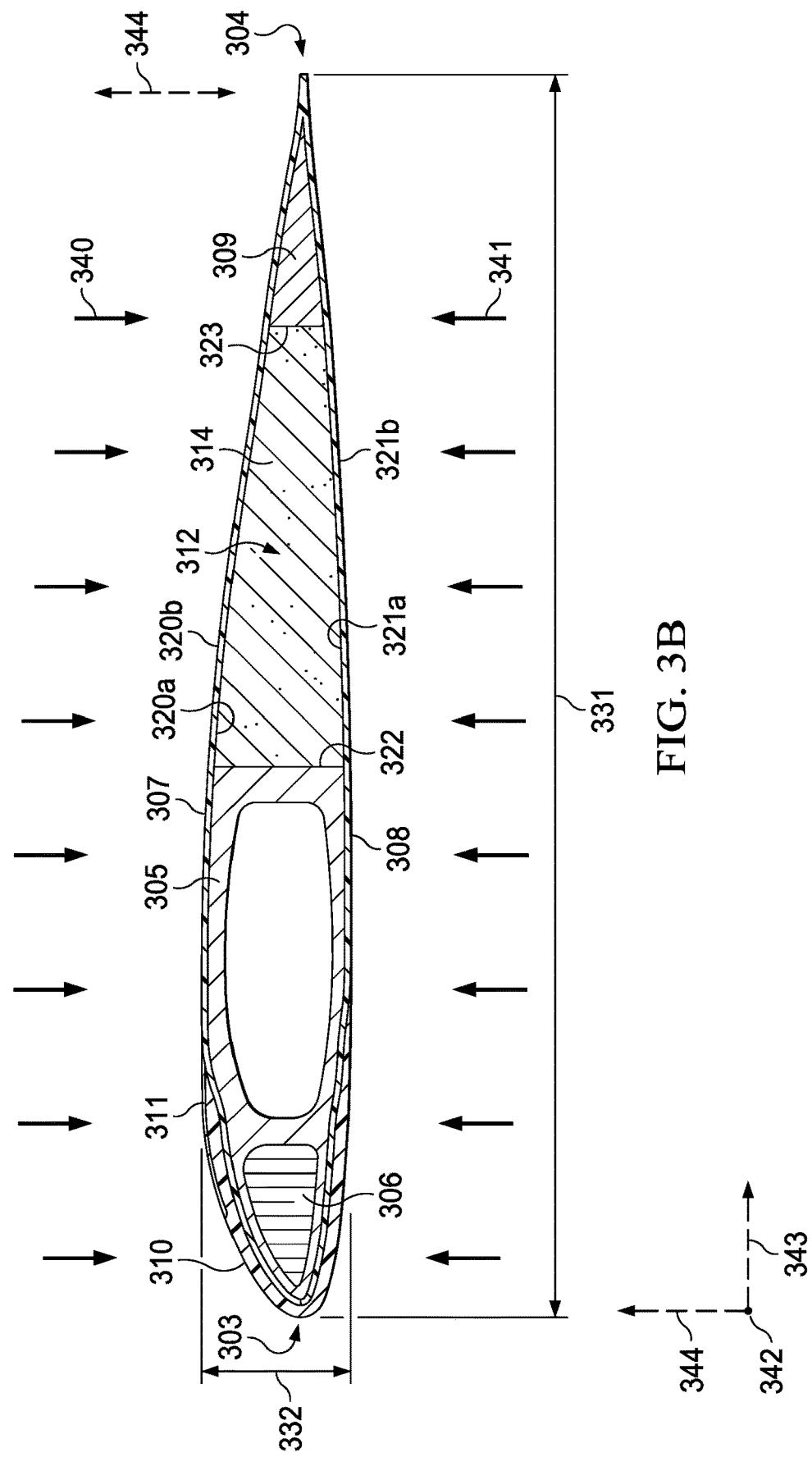
Figure 3C:
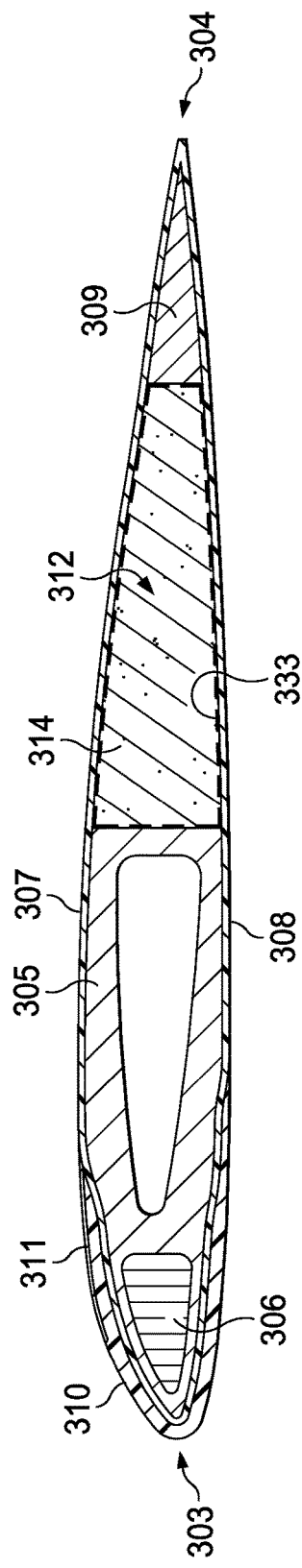
Figure 3D:
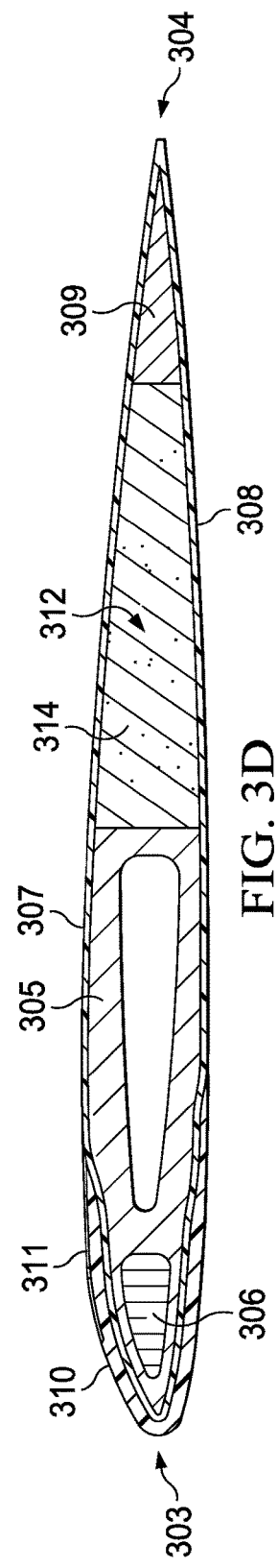
Figure 3E:
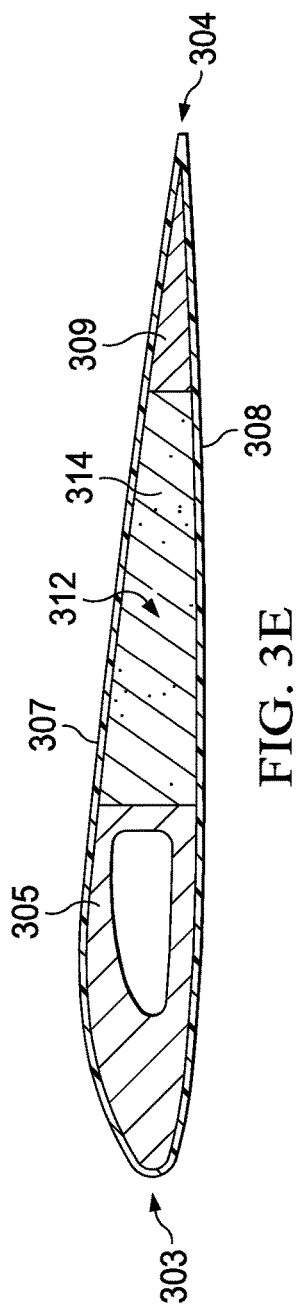

Referring to FIGS. 3A-3E, FIGS. 3A-3E are simplified diagrams illustrating example details that may be associated with a rotor blade 300, in accordance with certain embodiments. In particular, FIG. 3A is a simplified plan view diagram illustrating example details that may be associated with rotor blade 300 and FIGS. 3B-3D are simplified cross-sectional, side view diagrams illustrating other example details associated that may be associated with rotor blade 300 at various locations of the rotor blade 300. The cross-section of FIG. 3B is cut along a line generally indicated by the line labeled '3B' in FIG. 3A. The cross-section of FIG. 3C is cut along a line generally indicated by the line labeled '3C' in FIG. 3A. The cross-section of FIG. 3D is cut along a line generally indicated by the line labeled '3D' in FIG. 3A. The cross-section of FIG. 3E is cut along a line generally indicated by the line labeled '3E' in FIG. 3A.

As illustrated in the embodiment of FIG. 3A, rotor blade 300 may include an inboard end 301 (typically referred to as a root), an outboard end 302 (typically referred to as a tip), a leading edge 303, and a trailing edge 304. Further as shown in the embodiment of FIG. 3A, rotor blade 300 may include a spar 305, and an inertia weight or weight(s) 306. The cross-sections of FIG. 3B-3E may represent cross-sections at different stations of rotor blade 300. A 'station' corresponds to a particular radial location along a span 330 of rotor blade 300 and can be identified using a station number that corresponds to a distance from the inboard end 301 of rotor blade 300 towards the outboard end 302 of rotor blade 300. In various embodiments, spar 305, inertia weight(s) 306, and/or other features of rotor blade 300 may or may not extend across the entire span 330 of rotor blade 300.

As illustrated in FIGS. 3B-3E, rotor blade 300 may also include an upper skin 307, a lower skin 308, a trailing edge wedge 309, and a core area 312. Upper skin 307 may include an inner surface 320a and an outer surface 320b and lower skin 308 may include an inner surface 321a and an outer surface 321b. A portion of the upper skin 307 inner surface 320a and a portion of the lower skin 308 inner surface 321a may be adjacent to the core area 312.

For embodiments described herein, core area 312 is filled with a solid foam material 314 to provide a core structure for the core area 312. Solid foam material 314 may be both rigid and flexible to provide structural strength and/or stiffness for upper and lower skins 307, 308 to resist inward pressure (generally indicated by arrows 340, 341) that may be exerted on the rotor blade 300 during manufacture and/or operation so as to help maintain the designed geometry of the rotor blade 300. In some embodiments, solid foam material 314 may be particularly useful to fill and provide structural strength and/or stiffness in portions of rotor blade 300 where narrow and/or slender geometries of core area 312 may exist. Features related to methods for filling core area 312 with a solid foam material 314 are discussed in further detail herein. As referred to herein in this Specification, the terms 'rotor blade' and 'blade' can be used interchangeably.

As shown in FIGS. 3B-3D, some portions of rotor blade 300 may include a cap 310 and an abrasion strip 311. Spar 305 may be a structural component provided along at least a portion of the span 330 of rotor blade 300 to provide strength and/or stiffness for rotor blade 300. Trailing edge wedge 309 may be a structural component that may aid in bonding the upper skin 307 and the lower skin 308 together during manufacturing. Spar 305 may have an aft wall 322 adjacent to the core area 312 and trailing edge wedge 309 may have a forward wall 323 adjacent to the core area 312. In at least one embodiment, the combination of the upper skin 307 inner surface 320a, the lower skin 308 inner surface 321a, the spar 305 aft wall 322, and the trailing edge wedge 309 forward wall 323 may represent an inner mold line (IML), as generally indicated by dashed-line 333 shown in FIG. 3C.

Cap 310 and abrasion strip 311 may be used to protect the leading edge 303 of rotor blade 300 from harmful particles (e.g., sand, dirt, etc.) during operation. Cap 310 may cover leading edge portions of upper skin 307 and lower skin 308. Abrasion strip 311 may cover portions of cap 310 and leading edge portions of upper skin 307 and/or lower skin 308 and may taper off. In various embodiments, a rotor blade (e.g., rotor blade 300) may include other structural components and/or features such as de-icing components, attachment components (e.g., for attaching the rotor blade to a rotor hub), other spars, combinations thereof, or the like as would be appreciated by one of ordinary skill in the art.

Rotor blade 300 may have a chord length 331 as measured between the leading edge 303 and the trailing edge 304. Chord length 331 may vary along the span 330 of rotor blade 300 as the dimensions of rotor blade 300 may vary along the span. Rotor blade 300 may also have a height 332 as measured between the upper skin 307 and the lower skin 308. Height 332 may also vary along the span 330 of rotor blade 300 as the dimensions of rotor blade 300 may vary along the span. The spar 305 and inertia weight 306 may also have varying dimensions along the span 330 of rotor blade 300, as illustrated in FIGS. 3B-3E. In various embodiments, the span 330 of rotor blade 300 may vary between 3 feet and 24 feet; however, other spans (shorter or longer) can be envisioned depending on applications and/or implementations. For example, rotor blades discussed for various embodiments described herein may include proprotor/main rotor blades and/or tail rotor blades.

In various embodiments, any of upper skin 307, lower skin 308, trailing edge wedge 309, cap 310, and/or abrasion strip 311 may made of metals (e.g., steel, nickel, titanium, aluminum, etc.), metal alloys, composite materials, reinforced composite materials (e.g., carbon fiber reinforced polymers (CFRPs)), fiberglass, reinforced fiberglass, plastics, reinforced plastics, combinations thereof, or the like. Note, some of the elements of rotor blade 300 illustrated in FIG. 3B are included in other ones of the accompanying FIGS.; however, the discussion of some of these elements may not be repeated when discussing these FIGS. and any of these elements may take any of the forms disclosed herein.

A rotor blade (e.g., rotor blade 300) is typically designed and manufactured to meet specific performance targets for a particular production aircraft (e.g., tiltrotor aircraft, rotorcraft, etc.), such as targets for strength, rotor inertia, blade vibration, and blade stability, among others. Conventionally, the core area of a rotor blade can include a composite or metal honeycomb core material (e.g., NOMEX®) or a foam core material (e.g., Rohacell®) that is typically pre-machined within certain tolerances to fit within the core area of the rotor blade. Conventional manufacturing of a rotor blade that includes a honeycomb or foam core material generally involves assembling the rotor blade components (e.g., upper/lower skins, adhesive films, spars, weights, core material, trailing edge wedge, etc.) in a bonding tool, closing the bonding tool around the assembled components, and bonding the components together under pressure and/or heat to form the rotor blade. The bonding tool has a fixed volume when it is closed. Following the bonding, the rotor blade is typically cured using a curing process that may also include pressure and/or temperature.

Each of the components of a conventional rotor blade is manufactured with nominal dimensions within certain design tolerances. For example, the upper and lower skins may be manufactured with a nominal shape/thickness/dimensions within a prescribed+/−degree of tolerance. Similarly, other components such as the pre-machined core, spar, trailing edge wedge, etc. with nominal dimension within a prescribed+/−degree of tolerance. As such, instances may occur in which the variation of tolerance conditions among the assembled components may cause the overall volume of the assembled components to be different than the fixed volume of the bonding tool. For example, if all of the components are manufactured to their maximum tolerance condition, the bonding tool may not be completely closed, which can be detrimental to bonding the components together. Conversely, if all of the components are manufactured to their minimum tolerance condition, then there may be gaps between sides of the bonding tool and the assembled components, which can also be detrimental to bonding the components together. In another example, tolerance variations among different components may result in a proper fit in the bonding tool for some portions of a rotor blade, while resulting in an improper fit in the bonding tool for other portions of the rotor blade, which can also be detrimental to bonding the components together.

Improperly bonded components can cause many problems. For example, in some cases, improper bonding can cause voids or disbonds to be present along the bond line between the upper and/or lower skins and the pre-machined core material, which may result in a lower quality rotor blade that may be unusable or may need further machining to repair any problems and can increase the cost and/or time of manufacturing rotor blades.

A variation in the dimensions of the core material of a given rotor blade that is to be manufactured is often a contributor to improper fit of components within a bonding tool. Generally, honeycomb or foam core materials can be received in pre-manufactured blocks of material, that need to be machined in-house to the nominal dimensions for a given rotor blade design. However, current core machining technology, which often involves carving a pre-manufactured core block using a 5-axis carving machine, is often incapable of maintaining the tolerances needed for different variations in rotor blade geometries. Thus, additional manual carving/shaping is often needed for pre-manufactured core materials, which can also increase the cost and/or time of manufacturing rotor blades.

In some cases, pre-manufactured core materials are bonded to the blade skins using an intermediate bonding process that occurs before the overall bonding process. The intermediate bonding process adds process time and additional tooling. In some cases, a foam core material can be pre-molded to fit the shape of the core area; however, use of such pre-molded foam core materials also utilize an intermediate bonding process that adds process time and additional tooling. Use of such core materials can be expensive due to the close tolerances needed for the core structures and tooling to ensure proper fit into the rotor blade. Additionally, in some cases an extra cure step may be needed, which further increase cost and/or time of manufacturing.

Aside from the additional processes, tooling, etc. that may be needed for using pre-manufactured honeycomb core materials, such core materials are oriented within the core area of a rotor blade such that the sides of the honeycomb structures of the core material are packed together in a horizontal orientation along the span and chord length of the rotor blade, while the ends of the honeycomb structures of the core material are (at least partially) are oriented in contact with the inner surfaces of the upper and lower skins. [Note if the honeycomb structures were oriented with the sides of the honeycomb structures in contact with the upper and lower skins, the structure would be likely to crush under pressure.] Thus, even under ideal conditions, only a limited portion of honeycomb core material (e.g., edges of the honeycomb structures of the material) forms a bond line with the upper and lower skins.

It is also desirable to provide blade manufacturing methods that are repeatable and/or certifiable (e.g., by a certifying body or organization) for manufacturing many different blade types and/or styles for different types of aircraft. In particular, it is desirable to provide manufacturing methods in which each manufactured blade for a given manufacturing method meets certain quality control criteria. Such quality control criteria may be desirable to provide for the cost and/or time efficient manufacture of an aircraft (e.g., as changes beyond tolerances of rotor blades can affect the design of other aircraft components and/or integration of the blades with other aircraft components), as well as to ensure that aircraft meet certain safety guidelines. One quality control criteria may need to be met may include density variation of the core structure of rotor blades. For example, a core density of approximately +/−10% variation across the span of a blade and across multiple blades of a given design may be one quality control criteria for a blade manufacturing process. Other quality control criteria that may need to be met to ensure repeatable and/or certifiable rotor blade construction may include, weight, core bond line voids or disbonds, non-destructive inspection criteria and/or testing, combinations thereof, or the like.

This disclosure describes various embodiments for providing a liquid foam mixture in the hollow core area of an assembled rotor blade. Once provided in the hollow core area, the liquid foam mixture polymerizes during a polymerization stage. The polymerization stage is the expansion of the foam from a chemical reaction of the foam mixture. As the foam expands, it fills the hollow core area of the rotor blade and also adheres to the exposed inner surfaces of the upper and lower skins, as well as the inner walls of the spar and trailing edge wedge. One or more openings may be provided in the upper skin, the lower skin, and/or the trailing edge of the rotor blade to allow volatiles to escape during the polymerization stage, to facilitate a complete and homogeneous fill of the core area of the rotor blade, and/or to create a desired pressure within the core area, which can be used, at least in part, to adjust the density of the expanded foam. Once expanded, the foam may provide a solid foam material for the rotor blade core area.

Embodiments described throughout this disclosure that involve using a liquid foam mixture that expands and becomes a solid foam to fill the core area of a rotor blade may provide numerous technical advantages over conventional manufacturing methods that utilize conventional core materials. One advantage of embodiments herein may include providing for the ability to fill the core area of a rotor blade (e.g., once other components of the blade are bonded together) with an expandable foam using one or more methods, as discussed herein, that may be more cost and/or time efficient over conventional core material manufacturing methods. For example, using a liquid foam mixture that expands and becomes solid foam within the core area instead of a pre-manufactured or pre-molded core material may eliminate the extra machining, intermediate bonding, and/or intermediate curing operations that are typically utilized for manufacturing blades using conventional core materials.

Another advantage of embodiments described herein may be that a liquid foam mixture that expands and becomes a solid foam material may provide a solid foam core structure for a rotor blade that is formed in-place within the hollow core area of the blade such that the solid foam core fills all available space in the core area, which may prevent voids and/or disbonds between the core structure and the rotor blade skin(s), the spar aft wall, and the trailing edge wedge forward wall; thereby providing for a full bond line between the core structure and surrounding blade components, as opposed to the limited bond line provided by honeycomb core materials. Thus, utilizing a liquid foam mixture that expands and becomes a solid foam in-place within the core area of a blade may help to eliminate tolerance concerns with the IML as it can expand to whatever shape, geometry, etc. that the IML may take and can allow for a wider variety of IML laminate contours without the need for IML tooling.

Although utilizing a liquid foam mixture that expands and becomes a solid foam material for the core structure of a blade may provide numerous technical advantages over blades that utilize conventional core materials, it can be challenging to utilize a liquid foam mixture in the manufacture of rotor blades in a manner that is repeatable and/or certifiable such that multiple rotor blades can be manufactured to meet certain quality control criteria (e.g., density variation, weight, etc.). In particular, it can be challenging to utilize a liquid foam mixture within the core area of blades for blades that may have spans up to 24 feet, or more, and/or may have complex geometries.

Example embodiments associated with forming a solid foam core structure for a rotor blade utilizing a liquid foam mixture are described below with more particular reference to the remaining FIGURES. Although example embodiments discussed herein are described with reference to tiltrotor aircraft 100 and/or rotorcraft 200, it should be appreciated that such aircraft are illustrative of a variety of aircraft in which solid foam core structures formed utilizing a liquid foam mixture may be used in accordance embodiments of the present disclosure. Other aircraft in which a liquid foam mixture may be used can include, for example, fixed wing airplanes, hybrid aircraft, unmanned aircraft, gyrocopters, a variety of helicopter configurations, and drones, among other examples.

Liquid Foam Mixture Features

Figure 4:
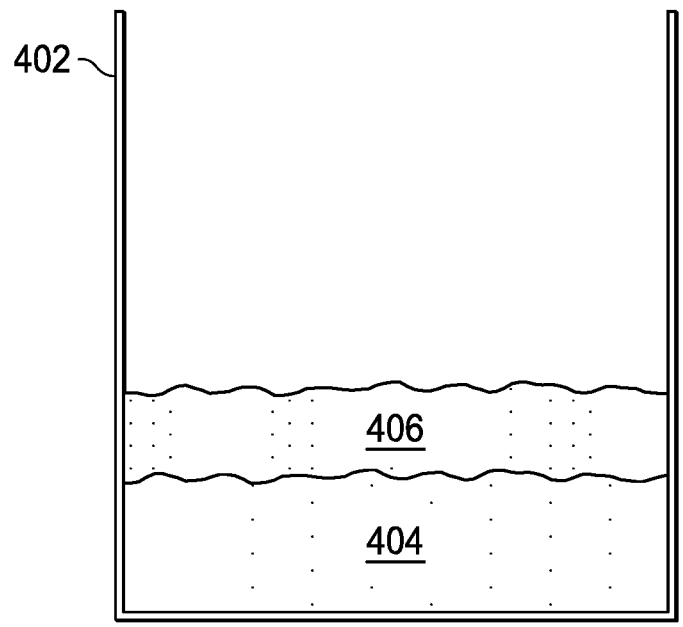
FIGS. 4-6 are simplified diagrams illustrating example details that may be associated with a foam system that may be used to fill a core area of a rotor blade, in accordance with certain embodiments.
Figure 5:
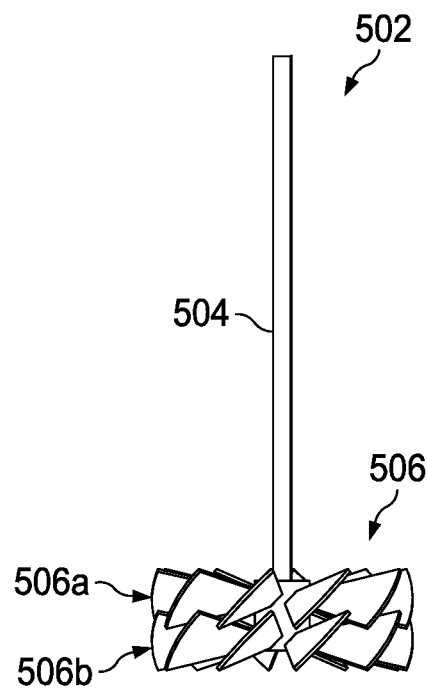
Figure 6:
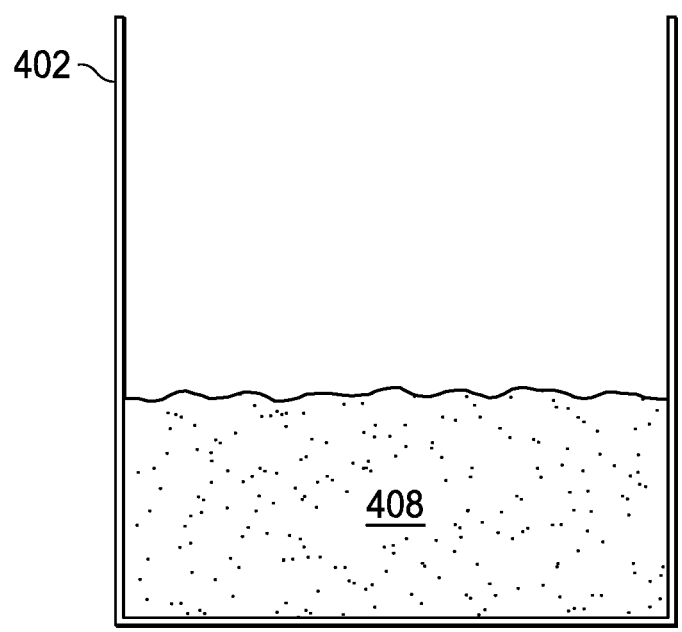

Features that may be associated with a foam system and liquid foam mixture that may be used form the solid foam material (e.g., solid foam material 314) of the core area (e.g., core area 312) for a rotor blade (e.g., rotor blade 300) are discussed in further detail with regard to FIGS. 4-6. In at least one embodiment, a foam system that may be used in the formation of solid foam material 314 may be a urethane foam system that expands to fill core area 312 of rotor blade 300. Upon curing, the foam material 314 may be rigid and flexible, while having a relatively low density. In at least one embodiment, a urethane foam system that may be used to form solid foam material 314 may be a polyisocyanurate pourable foam system marketed under the name of Stepanfoam®, produced by the Stepan Chemical Company or a polyisocyanurate pourable foam system marketed under the name JFoam™ BX-450, produced by J6 Polymers. It should be fully appreciated that other foam systems that may be capable of being provided in the core area of a rotor blade in a non-solid form may be utilized in accordance with embodiments described herein.

In at least one embodiment, the foam system may include two separate resin components, namely a T-component resin 404 (70% by weight) and an R-component resin 406 (30% by weight). The T-component resin may be a polymeric MDI and the R-component resin may be a polyol blend.

In at least one embodiment, the desired weight amounts of T-component resin 404 and R-component resin 406 may be measured and poured into a container 402 and may be mechanically agitated to form a homogenous liquid foam mixture 408, as illustrated in the embodiment of FIG. 6. In at least one embodiment, a mixer 502 may be used in rotation in order to mix T-component resin 404 and R-component resin 406 to form liquid foam mixture 408.

As illustrated in FIG. 5, a mixer 502 may include a shaft 504 and a plurality of blades 506 in at least one embodiment. In at least one embodiment, a first set of blades may be located on a first blade disc 506*a* and a second set of blades may be located on a second blade disc 506*b*. In at least one embodiment, shaft 504 may be configured to be driven by a drill motor, or the like. In at least one embodiment, mixer 502 may be rotated at 3500 revolutions per minute for approximately 10 seconds to 15 seconds when mixing T-component resin 404 and R-component resin 406 to form liquid foam mixture 408. In at least one embodiment, once the mixing is complete, liquid foam mixture 408 may be poured into core area 312 as quickly as possible, as the reaction time for the polymerization stage of the liquid foam mixture may occur between 40 seconds and 65 seconds. Features related to pouring liquid foam mixture 408 into the core area 312 of rotor blade 300 are discussed further herein. Although a liquid foam mixture may be poured into the core area of a rotor blade in some embodiments, other embodiments may include methods for providing the liquid foam mixture in the core area using one or more different types of foam delivery systems, which are also discussed further herein.

Although in some embodiments, the T-component resin 404 and the R-component resin may be mixed by weight amount, in other embodiments the T-component resin 404 and the R-component resin may be mixed by volume amount. The total weight amount of liquid foam mixture 408 may be at least partially dependent on the desired density and the volume of a core area 312 that is to be filled with a solid foam material 314. For example, because density is the relationship is mass per unit volume, the desired density of a solid foam material 314 at least partially dictates the weight amount of the liquid foam mixture 408. However, as discussed further herein a small portion of the liquid foam mixture 408 may escape through one or more opening(s) that may be provided about a core area 312 of a given rotor blade 300 when it is hollow (e.g., prior to filling it with the foam), which can also affect the final density of the solid foam material 314.

In various embodiments, methods described herein may use opening(s) provided about a core area 312 of a given rotor blade 300 to allow volatiles to escape during the polymerization of the liquid foam mixture 408 (typically referred to as 'outgassing'), while also creating a desired pressure within the core area 312 of the given blade. For example, pressure within a given core area 312 can inhibit expansion of a liquid foam mixture 408 during the polymerization process, thereby increasing the density of the solid foam material 314. As such, the size and number of opening(s) may be configured so as to selectively tailor the density of a solid foam material 314 for a given rotor blade 300. In some embodiments, opening(s) may be provided for a core area 312 of a given rotor blade 300 to create a solid foam material 314 within the core area having a density of approximately 12-16 pounds/ft$^3$. However, in some embodiments, this size and quantity of opening(s) may be increased to produce a solid foam material 314 having a lower density or may be decreased to produce a solid foam material 314 having a higher density.

Other factors may affect the density of a solid foam material 314 for a given rotor blade 300. For example, one factor that may affect the density of a solid foam material 314 of a given rotor blade 300 may be the temperature at which the liquid foam mixture 408 is provided in the core area 312 of the given blade. If the temperature at which the liquid foam mixture 408 is provided in the core area 312 is below ambient temperature (e.g., lower than 70 degrees Fahrenheit), the liquid foam mixture 408 may be more viscous and may expand less, which can result in a solid foam material 314 having an increased density. Conversely, if the temperature at which the liquid foam mixture 408 is provided in the core area 312 is at an elevated temperature (e.g., at or above 100 degrees Fahrenheit), the liquid foam mixture 408 may be more viscous and may expand more, which can result in a solid foam material 314 having a decreased density. In some embodiments, a higher temperature liquid foam mixture 408 will increase the reaction rate of the mixture, giving less time to provide it in the hollow core area of a given blade but allowing the liquid to flow more easily and fill the blade faster. Conversely, in some embodiments, decreasing the temperature will reduce the reaction rate, giving more time to pour but making the liquid more viscous and potentially more difficult to fill the hollow core area of a given blade.

Another factor that may affect the density of a solid foam material 314 for a given rotor blade 300 may be hydrostatic pressure due to weight of a liquid foam mixture 408. For example, in some embodiments, a given rotor blade 300 may be tilted along one or more directions as a liquid foam mixture 408 is provided in the core area 312 of the given blade. In some embodiments, at least one of the outboard end 302 and/or the leading or trailing edge 303, 304 of a given rotor blade 300 may be tilted downward as a liquid foam mixture 408 is provided in the core area 312 of the given blade. In some embodiments, increasing the downward tilting angle for a given blade along one or more directions while a liquid foam mixture is provided in the hollow core area of the blade may allow the liquid foam mixture to reach tight cavities; whereas decreasing the tilting angle while providing the liquid foam mixture may help to ensure the foam provides good coverage for the core area as it expands.

For embodiments in which a given rotor blade 300 is tilted along one or more directions, subsequent liquid foam provided in the core area can push down on previous liquid foam provided in the core area 312 of the given blade. Hydrostatic pressure that may be created due to the weight of a liquid foam mixture 408 pushing down on itself can also increase the density of solid foam material 314. In various embodiments, the amount of hydrostatic pressure that may be created for a liquid foam mixture 408 may be adjusted based on one or more of: the degree(s) and/or direction(s) of tilting of a given rotor blade 300, the flow rate at which the liquid foam mixture 408 is provided in the core area 312 of a given rotor blade 300, the location(s) (e.g., station(s) along the span 330 of a given rotor blade 300) that the liquid foam mixture 408 is provided in the core area 312 of the given blade, the temperature at which the liquid foam mixture 408 is provided in the core area 312 of a given rotor blade 300, the reaction time of the liquid foam mixture 408, combinations thereof, or any other factors that might affect hydrostatic pressure created by the liquid foam mixture 408. In at least one embodiment, the degree(s) and/or direction(s) of tilting a given rotor blade 300 can be relative to a horizontally level position of the rotor blade along an inboard-outboard axis (generally represented by arrows 342) and/or a forward-aft axis (generally represented by arrows 343) in relation to a vertical axis (generally represented by arrows 344).

Other factors may be considered to adjust the density of a solid foam material 314 for a given rotor blade 300. For example, in some embodiments, the density of a solid foam material 314 for a given rotor blade 300 may be adjusted based, at least in part, on the expected operational loading of the given rotor blade 300. It is to be understood that the density of a solid foam material 314 is preferably customizable in accordance with the specific implementation and/or application of the solid foam material 314 in a given rotor blade 300 and may, therefore, be adjusted based on implementation(s) and/or application(s) in accordance with embodiments described herein.

Methods for Providing a Liquid Foam Mixture in a Rotor Blade Core Area

Because rotor blades may vary greatly in span and, in some cases may have spans up to or greater than 24 feet, it can be challenging to utilize a liquid foam mixture (e.g., liquid foam mixture 408) in a manner such that the quality of manufactured rotor blades meets certain quality control criteria. For example, in some cases, approximately 15 ounces of a liquid foam mixture may be used to form a solid foam material for a given rotor blade that may have a span of 24 feet. Providing such a small volume of liquid foam mixture (e.g., 15 ounces) within the hollow core area of a blade that has varying dimensions and extends across a span of 24 feet in order to form a solid foam material in the core area that has a density variation of only 10% across the 24 foot span is extremely challenging. Further, providing a repeatable and/or certifiable manufacturing method utilizing a liquid foam mixture that results a 10% density variation across multiple 24 foot blades is even more challenging. Features that may be associated with providing a liquid foam mixture in a hollow core area of a given rotor blade are discussed in further detail with regard to FIGS. 7-13.

Figure 7A:
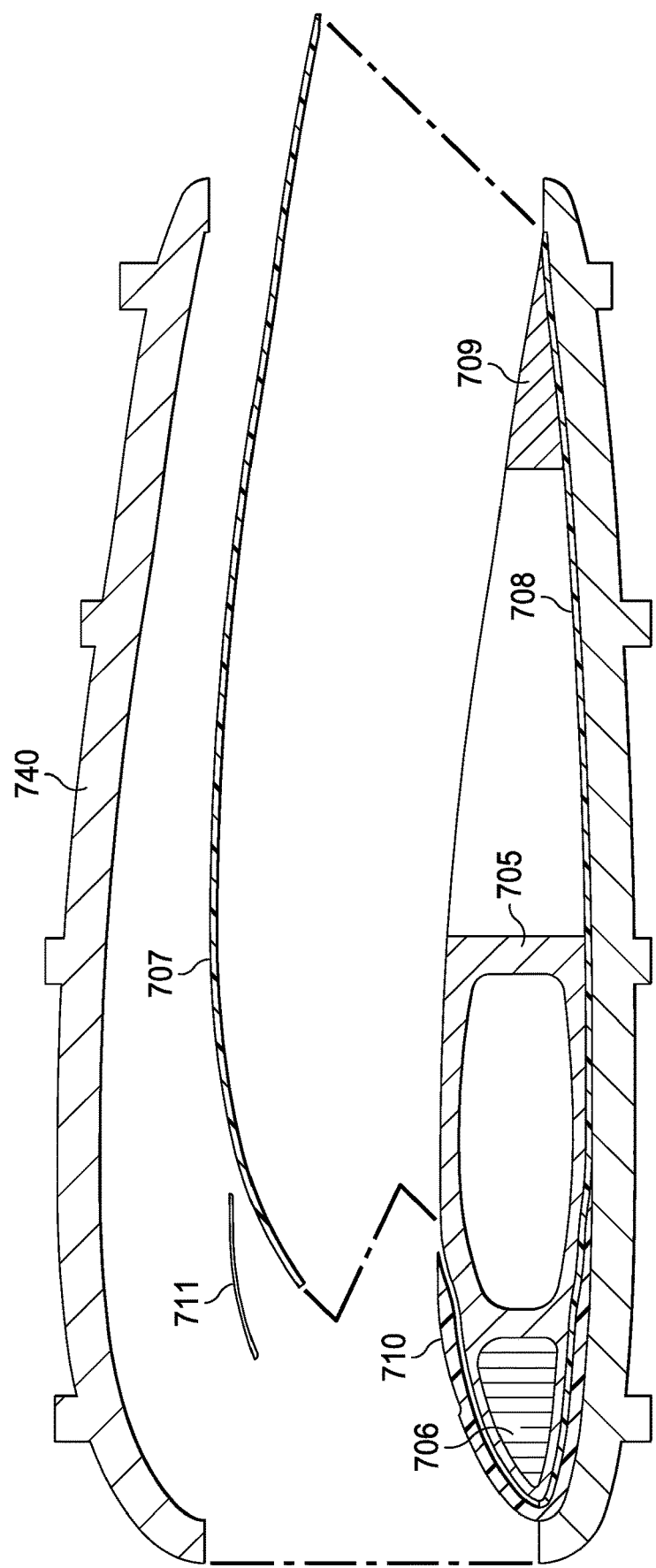
FIGS. 7A-7C are simplified diagrams illustrating example details that may be associated with forming an example rotor blade, in accordance with certain embodiments.
Figure 7B:
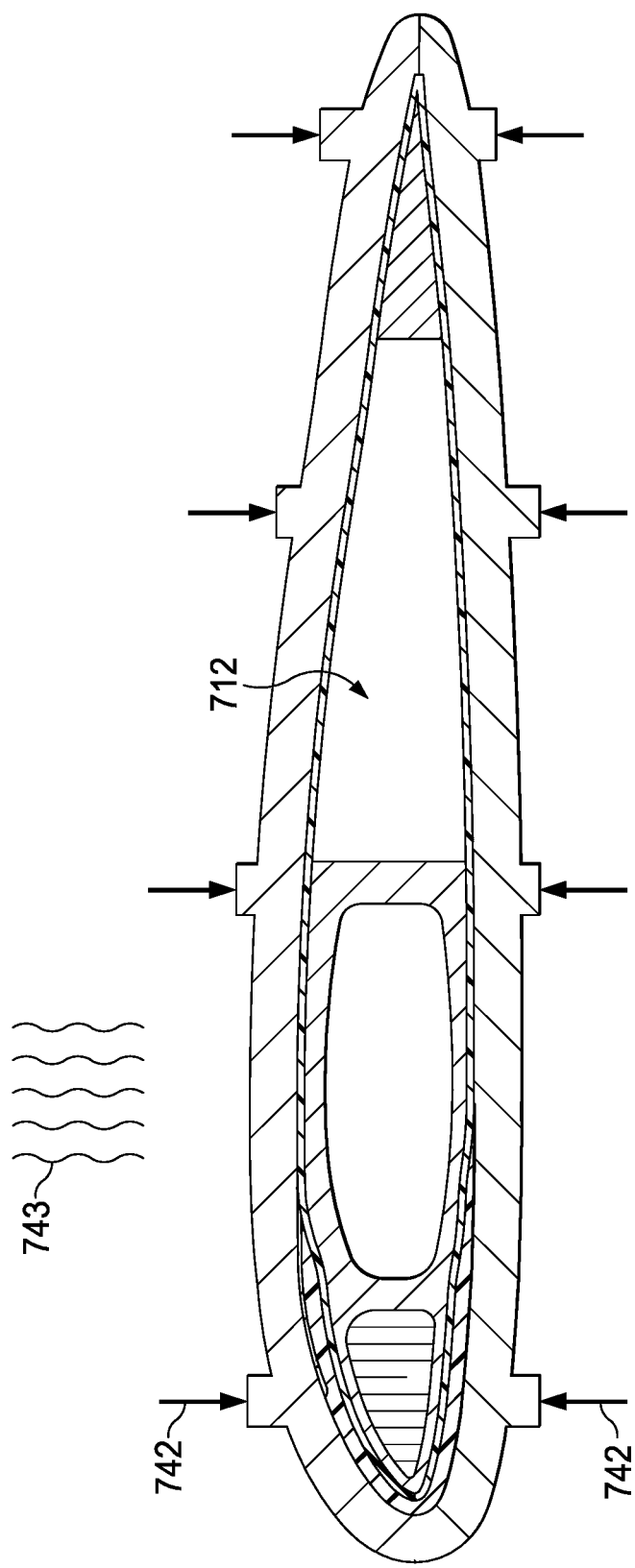
Figure 7C:
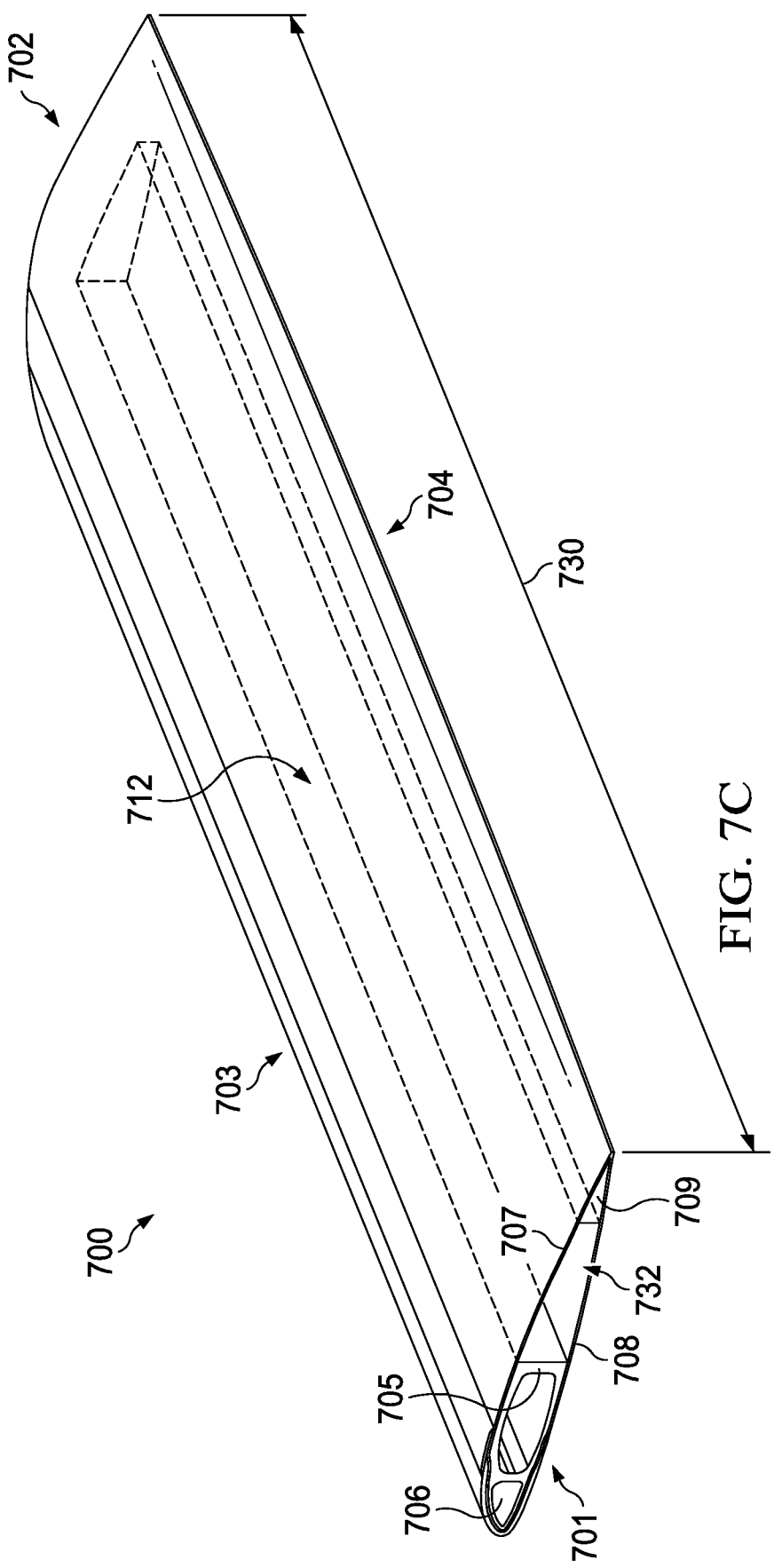

For example, FIGS. 7A-7C are simplified diagrams illustrating example details that may associated with forming an example rotor blade 700 in which the rotor blade has a hollow core area 712 that can be filled with a foam material, in accordance with certain embodiments. FIGS. 8A-8D are simplified diagrams illustrating example details that may be associated with providing a liquid foam mixture (e.g., liquid foam mixture 408) in a core area 712 of a given rotor blade 700 using various pouring methods, in accordance with certain embodiments. FIGS. 9A-9C are simplified diagrams illustrating example details that may be associated with providing a liquid foam mixture in a core area 712 of a given rotor blade 700 using a foam delivery system 900, in accordance with certain embodiments.

Figure 11A:
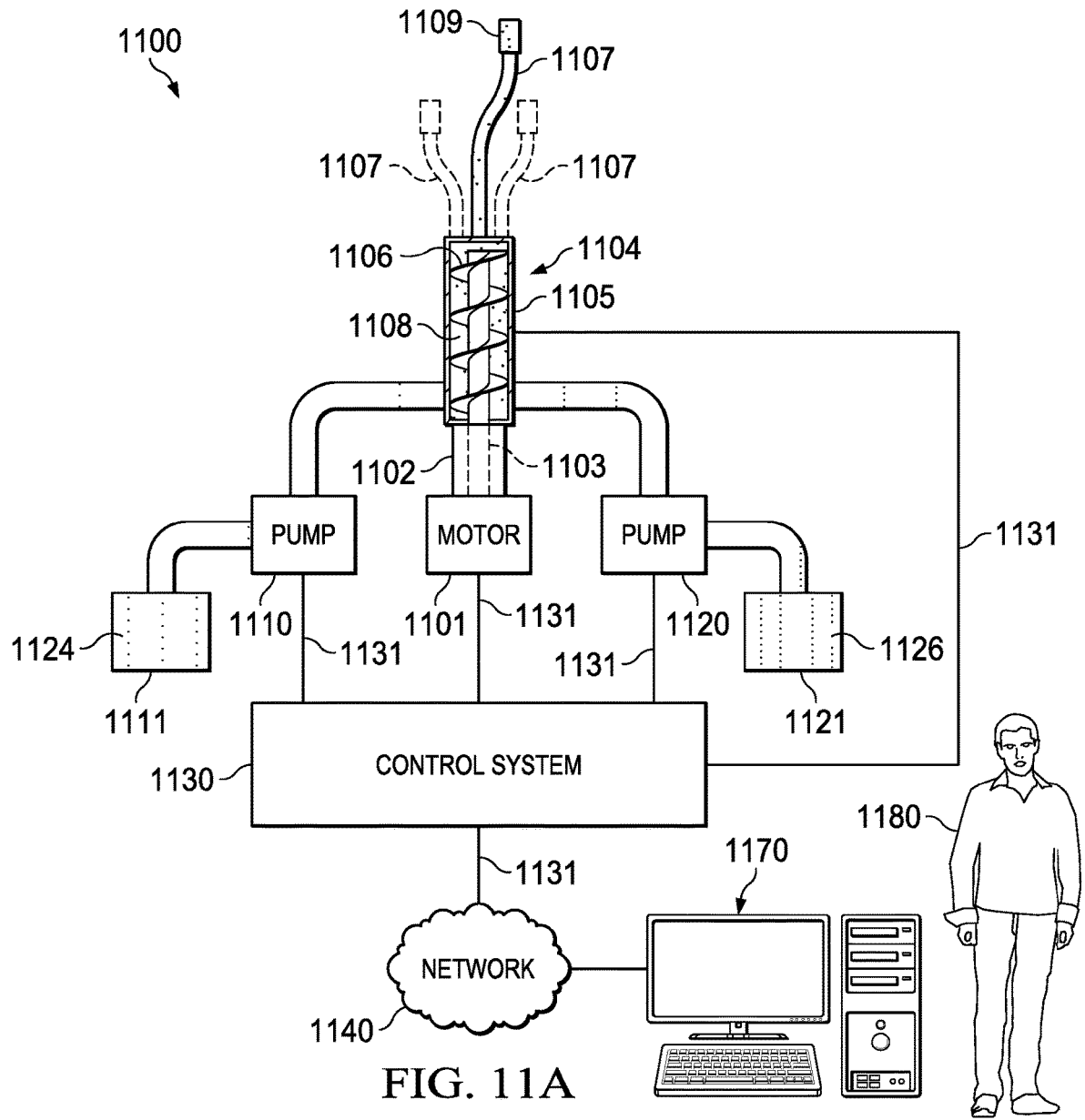
FIGS. 11A-11C are simplified diagrams illustrating other example details that may be associated with providing a liquid foam mixture in a core area of a rotor blade using another foam delivery system, in accordance with certain embodiments
Figure 11B:
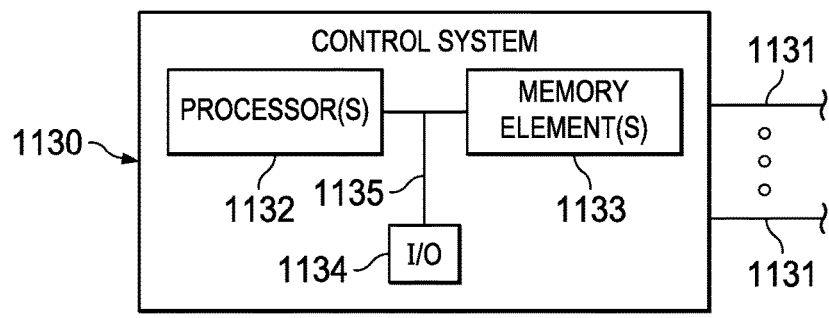
Figure 11C:
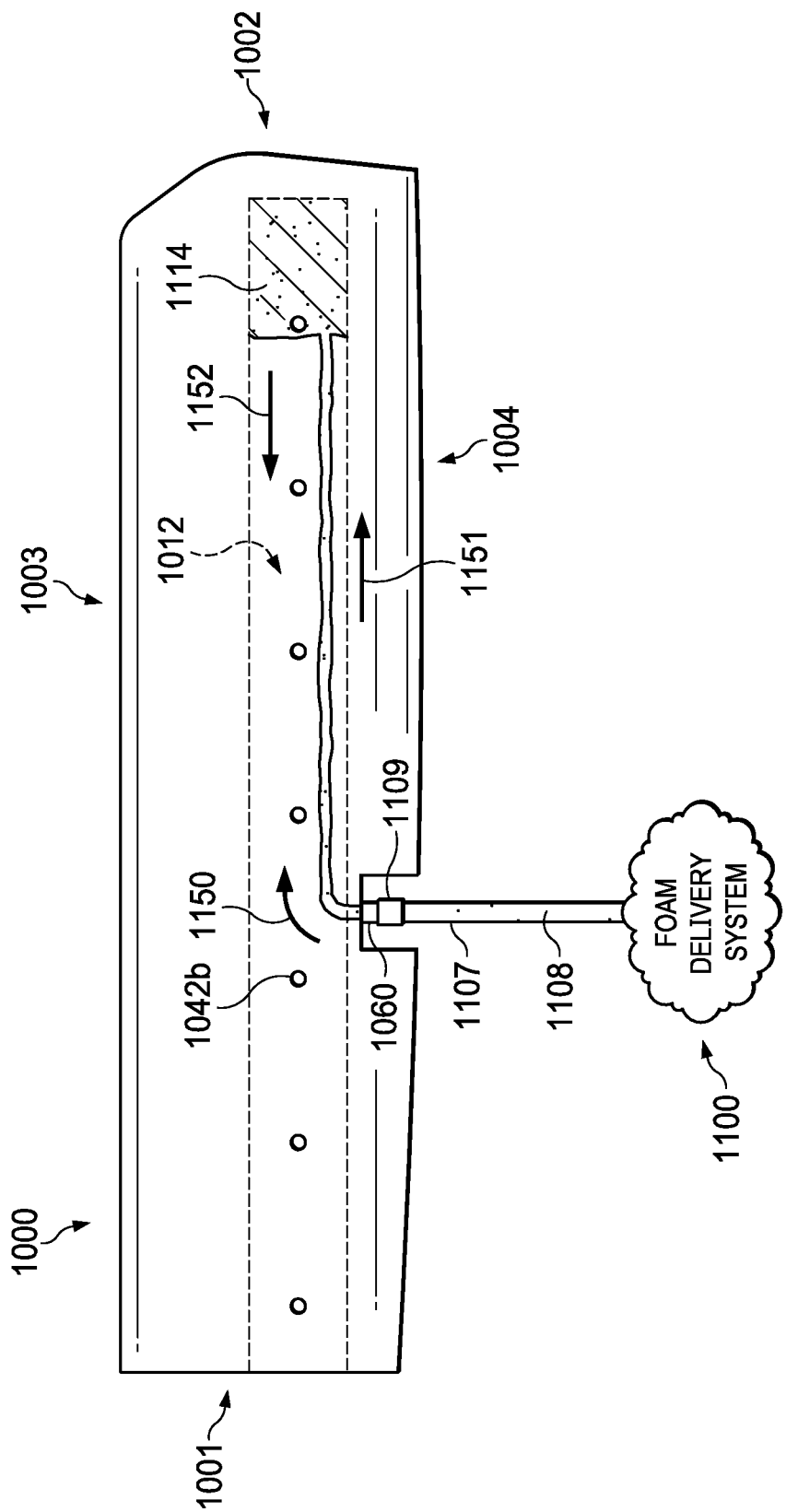
Figure 12:
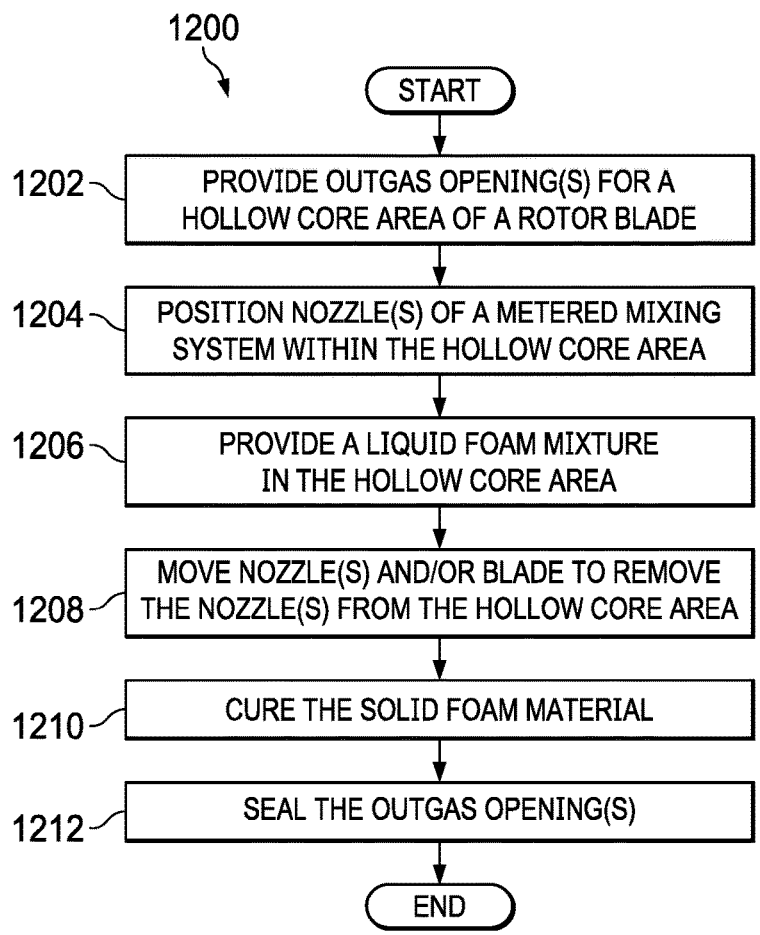
FIGS. 12-13 are simplified flowcharts illustrating example details associated with filling a core area of a rotor blade with a solid foam material using a liquid foam mixture provided in the core area, in accordance with certain embodiments.
Figure 13:
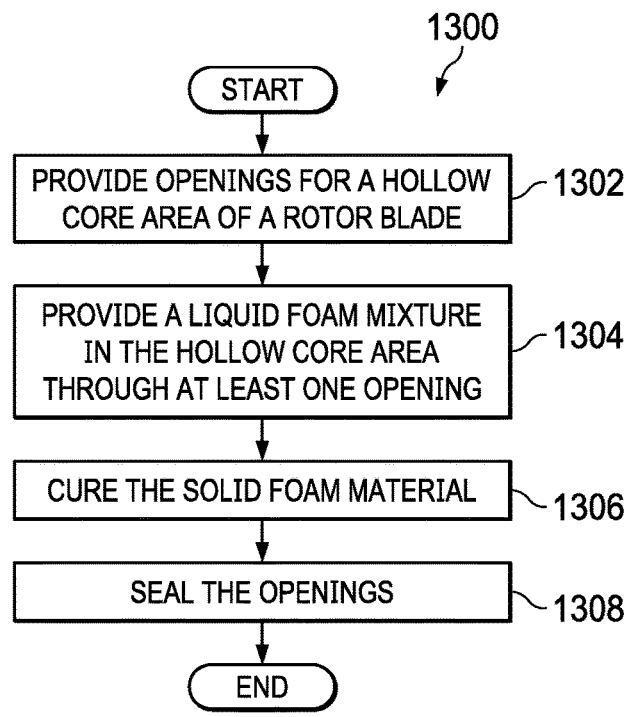

FIGS. 10A-10B are simplified diagrams illustrating example details that may be associated with another example rotor blade 1000 in which the rotor blade has a core area 1012 that can be filled with a foam material, in accordance with certain embodiments. FIGS. 11A-11C are simplified diagrams illustrating example details that may be associated with providing a liquid foam mixture in a core area 1012 of a given rotor blade 1000 using a foam delivery system 1100, in accordance with certain embodiments. FIGS. 12-13 are simplified flowcharts illustrating example details associated with providing a liquid foam mixture in a hollow core area of a rotor blade, in accordance with certain embodiments.

In at least one embodiment, a rotor blade 700 may include a lower skin 708, a cap 710, a spar 705, an inertia weight 706, a trailing edge wedge 709, an upper skin 707, and an abrasion strip 711 that may be assembled together within a lower bonding tool 741 as shown in FIG. 7A. An upper bonding tool 740 may be closed over the assembled components. As illustrated in FIG. 7B, pressure 742 and heat 743 may be applied in order to bond the components together. In some embodiments, adhesives and/or adhesive films may be incorporated to aid in bonding the components together. A hollow core area 712 is present for the rotor blade 700 after the components are bonded together. The bonded components may also be cured using one or more cure cycles that may include elevated temperature(s) and/or pressure(s) applied to the bonded together rotor blade 700. Various methods may be used to bond components together for a given rotor blade as would be appreciated by one of ordinary skill in the art.

As illustrated in FIG. 7C, rotor blade 700 may include an inboard end 701, an outboard end 702, a leading edge 703, and a trailing edge 704. The outboard end 702 may be closed with the upper and lower skins 707, 708 bonded together. In some embodiments, an additional wedge (not shown) or trailing edge wedge 709 may extend between the leading edge 703 and the trailing edge 704 along the outboard end to facilitate bonding the upper and lower skins for the rotor blade 700. In some embodiments, the inboard end 701 of core area 712 may have an opening (732); however, in other embodiments, the inboard end 701 of core area 712 may be closed. In various embodiments, rotor blade 700 may have a span 730 up to 24 feet.

Figure 8C:
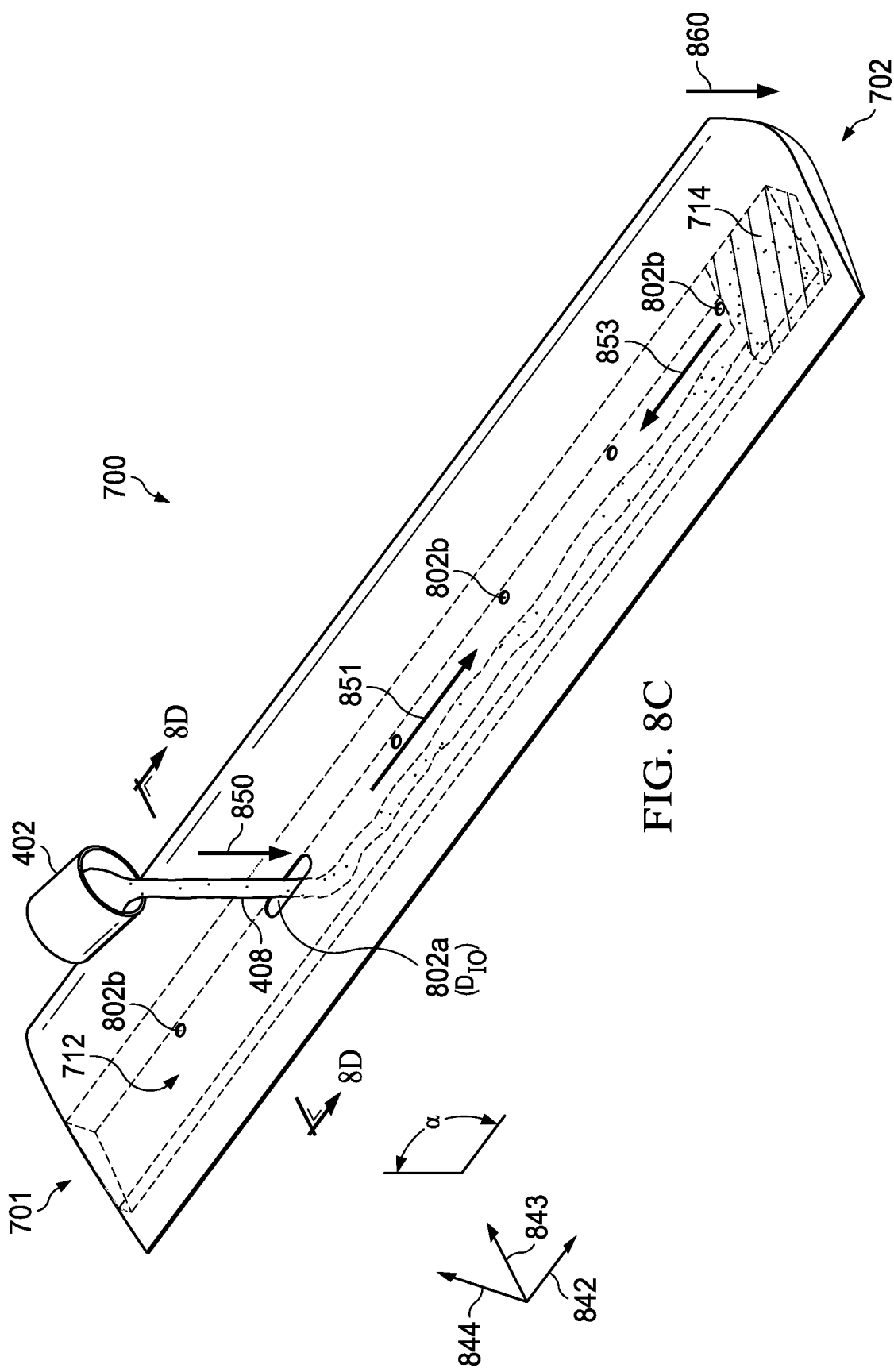

As illustrated in FIGS. 8A-8D, at least one method for providing a liquid foam mixture 408 in a hollow core area 712 of a given rotor blade 700 may include providing one or more opening(s) at one or more location(s) along the hollow core area 712 of the given rotor blade 700 and pouring the liquid foam mixture 408 into the hollow core area 712 using at least one of the openings to form a solid foam core 714 for the blade. An axis system is illustrated in FIG. 8C that includes an inboard-outboard axis 842 and a forward-aft axis 843 in relation to a vertical axis 844.

Referring to FIG. 8A, FIG. 8A is a simplified plan view diagram illustrating example details that may be associated with a given rotor blade 700 having a hollow core area 712, in accordance with certain embodiments. In at least one embodiment, a number of openings 802 may be provided for the upper skin 707 and may include one or more pour opening(s) 802a and multiple outgas openings 802b. In some embodiments, one or more opening(s) 802 may be provided by drilling or cutting openings 802 through upper skin 707 following bonding together components of a given rotor blade 700. In still some embodiments, one or more opening(s) 802 may be provided by drilling or cutting openings 802 through upper skin 707 prior to bonding together components of a given rotor blade 700.

In various embodiments, outgas openings 802b may have a diameter ranging between 0.010 inches and 0.0030 inches, however, other diameters can be envisioned. In some embodiments, outgas openings 802b may be provided at intervals between 12 inches and 36 inches along the span 730 of a given rotor blade depending on the desired density for the solid foam material for the given rotor blade; however, other intervals can be envisioned, depending on the desired density for the solid foam material for the given rotor blade.

In some embodiments, pour opening(s) 802a may have a circular diameter '$D_C$' (FIG. 8B). In some embodiments, pour opening(s) 802a may be elongated along the inboard-outboard axis 842 to have an inboard-outboard diameter '$D_{IO}$' (FIG. 8B). For example, in some embodiments, the outboard end 702 of a given rotor blade 700 may be tilted downward between 15 degrees and 75 degrees (relative to vertical axis 844) to enable gravity to pull the liquid foam mixture 408 downward toward the outboard end 702 of rotor blade 700. In such embodiments, pour opening(s) 802a may have an elongated inboard-outboard diameter $D_{IO}$, which may help to avoid pouring liquid foam mixture 408 on and/or to avoid it touching upper skin 707 when the outboard end 702 may be tilted downward during the pouring.

In still some embodiments, pour opening(s) 802a may be elongated along the forward-aft axis 843 to have a forward-aft diameter '$D_{FA}$' (FIG. 8B). For example, in some embodiments, the leading edge 703 of a given rotor blade 700 may be tilted downward between 15 degrees and 75 degrees (relative to vertical axis 844) to enable gravity to pull the liquid foam mixture 408 toward the leading edge of rotor blade 700. Similar to the inboard-outboard diameter, the forward-aft diameter $D_{FA}$ may help to avoid pouring liquid foam mixture 408 on and/or to avoid it touching upper skin 707 when the leading edge 703 may be tilted downward during the pouring.

In still some embodiments, pour opening(s) 802a may be elongated along both the inboard-outboard axis 842 and the forward-aft axis 843 to have a half-circle radius '$R_{HC}$' (FIG. 8B). For example, in some embodiments, any combination of the outboard end 702 and/or the leading edge 703 may be tilted downward to enable gravity to pull liquid foam mixture 408 toward the outboard end 702 and/or the leading edge 703 during the pouring.

In various embodiments, the diameter (e.g., $D_C$, $D_{IO}$, $D_{FA}$) or radius (e.g., $R_{HC}$) of pour opening(s) 802a may be several inches, or more. For example, in some embodiments, a larger diameter and/or radius for pour opening(s) 802a may be used when a larger tilting angle alpha (α) (as shown in FIG. 8C) may be used during the pouring in comparison to smaller tilting angle pours, which may have a smaller diameter and/or radius.

In some embodiments, pour opening(s) 802a may be located at a distance 734 (e.g., at a station) along span 730 that may be associated with a center of volume (sometimes referred to as 'volumetric split') for the fixed volume of hollow core area 712. As discussed herein, the dimensions of the core area 712 may vary between the inboard end 701 and the outboard end 702 (e.g., the core area 712 may be larger at the inboard end than at the outboard end) such that the center of volume for the core area may be located off-center from the center of span 730. In still some embodiments, the fixed volume of the hollow core area 712 of a given rotor blade 700 may be calculated and may be sub-divided into a number of respective sub-volumes, in which case a respective pour opening 802a may be provided at a respective distance along the span 730 relative to the volumetric split of each respective sub-volume. Other variations relating to pouring a liquid into a hollow core area of a rotor blade can be envisioned in accordance with embodiments described herein. Variations related to pouring a liquid foam mixture in a hollow core area of a rotor blade may be provided to attain a desired density and/or density variation of a solid foam material in the core area of a rotor blade.

Referring to FIG. 8C, in at least one embodiment, a liquid foam mixture 408 may be poured (as generally illustrated by arrow 850) through a pour opening 802a having an elongated inboard-outboard diameter ($D_{IO}$) while the outboard end 702 of rotor blade 700 may be tilted (as generally illustrated by arrow 860) downward at a tilt angle alpha (α). Gravity may pull the liquid foam mixture 408 downward (as generally illustrated by arrow 851) toward the outboard end 702. Liquid foam mixture 408 polymerizes and expands to fill the core area 712 with a solid foam material 714. Expansion of the liquid foam mixture 408 and/or expanding foam may be pushed upward (as generally illustrated by arrow 853) toward the inboard end 701 of rotor blade 700 to fill core area with solid foam material 714. In some embodiments, liquid foam mixture 408 may be heated or cooled. In some embodiments, the tilt angle alpha (α) of the rotor blade may be varied during the pouring (850). Other variations may be provided to adjust the density of solid foam material 714, as discussed for various embodiments described herein.

Figure 8D:
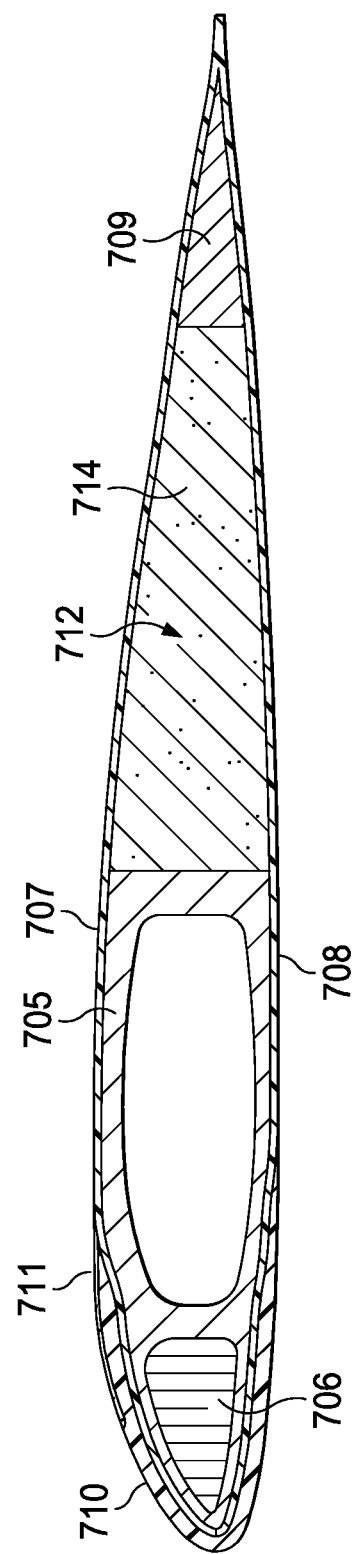
Figure 9A:
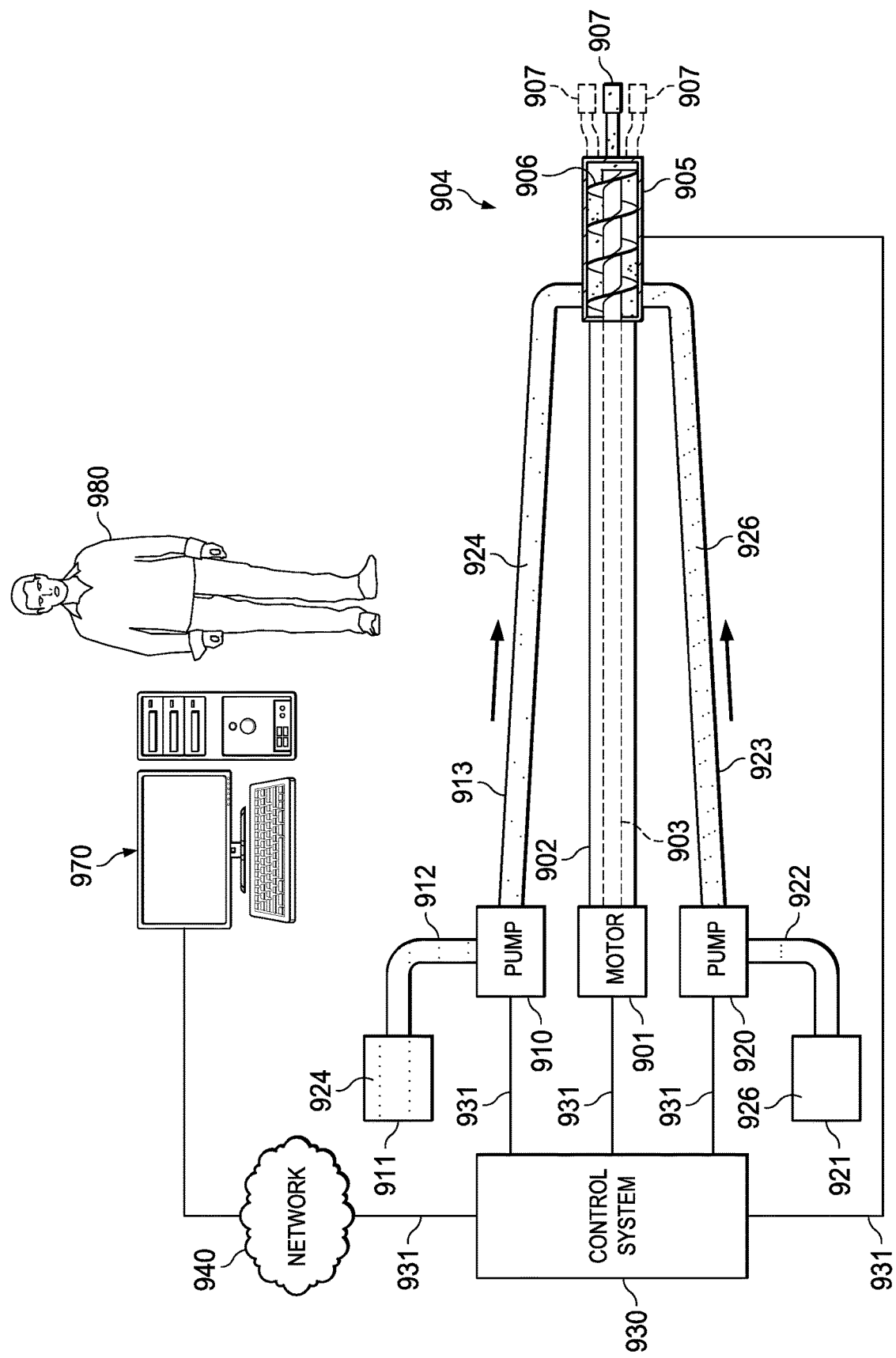
FIGS. 9A-9C are simplified diagrams illustrating example details that may be associated with providing a liquid foam mixture in a core area of a rotor blade using a foam delivery system, in accordance with certain embodiments.
Figure 9B:
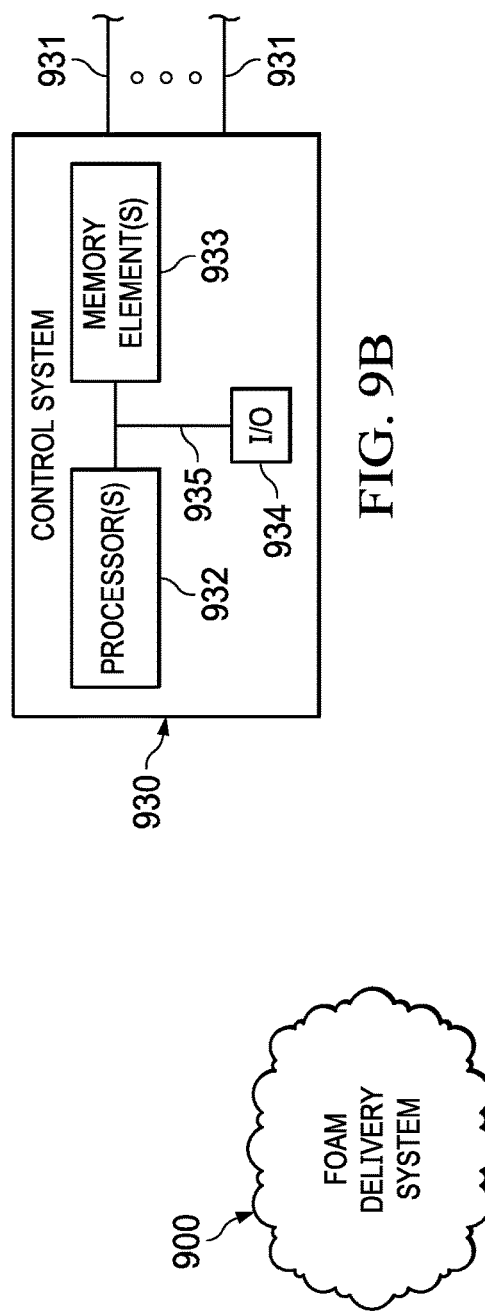
Figure 9C:
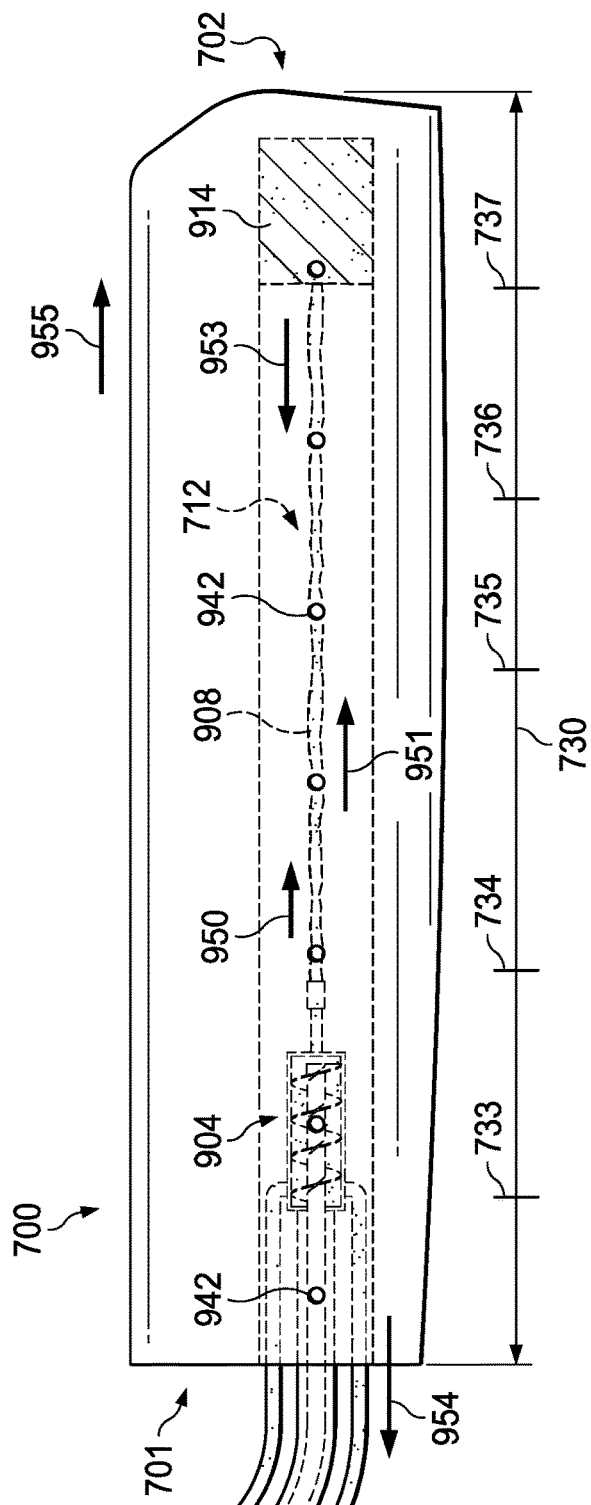

FIG. 8D is a side, cross-sectional view diagram (cut along a line generally indicated by the line labeled '8D' in FIG. 8C) of rotor blade 700 illustrating solid foam material 714. Solid foam material 714 may completely fill core area 712 and may adhere to the inner surface of the upper and lower skins 707, 708 as well as to the aft wall of spar 705 and the forward wall of trailing edge wedge 709. In some embodiments, solid foam material 714 may be cured using one or more cure cycles, which may include one or more elevated temperatures.

Some of the solid foam material 714 may escape one or more opening(s) 802 during polymerization. In some embodiments, excess foam material that may have escaped from one or more opening(s) during polymerization may be removed and the opening(s) may be sealed using known methods as would be appreciated by one of ordinary skill in the art. For example, in some embodiments, opening(s) 802 may be patched using composite materials that may be laid up over the holes, bonded to the upper skin, sanded, etc.

Although example features discussed in FIGS. 8A-8D are discussed with reference to opening(s) 802 provided in the upper skin 707 of a given rotor blade 700, it is to be understood that openings may be provided in the lower skin 708 in lieu of the upper skin 707 and a liquid foam mixture 408 may be provided in the hollow core area 712 in a similar manner as discussed for the embodiments of FIGS. 8A-8D.

Referring to FIGS. 9A-9C, in some embodiments, a liquid foam mixture 908 may be provided in the core area 712 of a given rotor blade 700 using a foam delivery system 900. FIG. 9A is a simplified schematic diagram illustrating details that may be associated with foam delivery system 900, in accordance with certain embodiments. In at least one embodiment, foam delivery system 900 may include a motor 901, a metered mixing system 904, a first pump 910 and a first reservoir 911, a second pump 920 and a second reservoir 921, and a control system 930. In at least one embodiment, metered mixing system 904 may include a housing 905 in which a spiral auger or worm gear 906 may be provided that may be connected to a rotating shaft 903 (within a protective covering 902) that may be in mechanical communication with motor 901. The metered mixing system 904 may further include one or more nozzle(s) 907. In at least one embodiment, control system 930 may be in communication with motor 901, first pump 910, second pump 920, and metered mixing system 904 via communication links 931, which may enable electronic communications between the components. In at least one embodiment, control system 930 may be in communication with a computing system 970 via a network 940. Also shown in FIG. 9A is a user 960.

In various embodiments, communication links 931 can include wired (e.g., serial, parallel, Ethernet, etc.) and/or wireless (e.g., Bluetooth™, WiFi, etc.) communication links. In various embodiments, foam delivery system 900 may also include various sensors (e.g., pressure, flow rate, temperature, etc.), valves, heating elements, cooling elements, combinations thereof, or the like, which are not shown but would be appreciated by one of ordinary skill in the art to facilitate various features described herein.

In at least one embodiment, foam delivery system 900 may provide for mixing together a prescribed amount of a T-component resin 924 and an R-component resin 926 to form a liquid foam mixture 908 that may be injected into a hollow core area 712 of a given rotor blade 700. During operation, for example, pump 910 may pump T-component resin 924 from first reservoir 911 (via a hose 912) into metered mixing system 904 (via a hose 913). Pump 920 may pump R-component resin 926 from second reservoir 921 (via a hose 922) into metered mixing system 904 (via a hose 923). Auger 906 may be rotated via motor 901 and shaft 903 at a given rotations per minute to mix T-component resin 924 and R-component resin 926 to form liquid foam mixture 908 within housing 905 and push the liquid foam mixture through nozzle(s) 907.

Control system 930 may control the amount of T-component resin 924 and R-component resin 926 that are pumped into metered mixing system 904. For example, in at least one embodiment, in-line valves (not shown) for hoses 913, 923 may be selectively opened and closed to control the amount of resin input to metered mixing system 904. Consider an example in which it may be determined that a particular weight amount of liquid foam mixture 908 may be used to form a solid foam material for a core area 712 of a given rotor blade 700 having a particular volume. For the present example, consider that a user 960 sets a weight amount of liquid foam mixture 908 to be 2.7 pounds for the core area of the given rotor blade 700. In this example, user 960 may input the weight amount via computing system 970, which may communicate the amount to control system 930. In turn, control system 930 may determine the appropriate amounts of T-component resin 924 and R-component resin 926 by weight (e.g., 70%/30%) to input into metered mixing system 904 and may control the operation of first and second pumps 910, 920 to facilitate to input the appropriate amounts of resin into metered mixing system 904. Control system 930 may also control the operation of motor 901 (e.g., the speed of auger 906) to control the flow rate of liquid foam mixture 908 through nozzle(s) 907.

Hoses 912, 913, 922, and 923 as well as shaft 903/covering 902 may have any suitable dimensions. For example, in some embodiments, the length of hoses 913 and 923 as well as shaft 903/covering 902 may have a length that is suitable to insert metered mixing system into a hollow core area 712 of a given rotor blade 700 that may have a span up to 24 feet or more, depending on the span of the given rotor blade 700.

Referring to FIG. 9B, FIG. 9B is a simplified block diagram illustrating example details that may be associated with control system 930. In at least one embodiment, control system 930 may include at least one processor(s) 932, at least one memory element(s) 933, and input/output (I/O) device(s) 934. At least one processor(s) 932 can be at least one hardware processor(s) that uses software, firmware, combinations thereof, or the like to execute operations. At least one memory element(s) 933 can store instructions that, when executed, cause processor(s) 932 to carry out one or more operation(s). In various embodiments, I/O device(s) may include display devices (e.g., a plasma display panel (PDP), a liquid crystal display (LCD), a light emitting diode (LED) display, a cathode ray tube (CRT), etc.), a keyboard, a touch screen, a mouse, a trackball, voice recognition, touch pad, etc. that may allow a user (e.g., user 960) to interact with control system 930. In some embodiments, I/O devices may include Ethernet ports, serial ports, parallel ports, wireless controllers, combinations thereof, or the like that may allow a user (e.g., user 960) to interact with control system 930 via one or more communication link(s) 931 (e.g., via network 940 and computing system 970).

Control system 930 may also include one or more buses, such as a system bus and a memory bus, collectively represented by a bus 935, for enabling communications between components of control system 930. Processor(s) 932, which may also be referred to as a central processing unit (CPU), can include any general or special purpose processor capable of executing machine-readable instructions and performing operations on data as instructed by the machine-readable instructions. A memory element 933 may be directly accessible by the hardware processor for accessing machine-readable instructions and may be in the form of random access memory (RAM) or any type of dynamic storage (e.g., dynamic random-access memory (DRAM)). Control system 930 may also include non-volatile memory, such as a hard disk, that is capable of storing electronic data including executable software files. In some embodiments, externally stored electronic data may be provided to control system 930 through one or more removable media drives, which may be configured to receive any type of external media such as compact discs (CDs), digital video discs (DVDs), flash drives, external hard drives, etc.

As used herein, the term 'removable media drive' refers to a drive configured to receive any type of external computer-readable media. Instructions embodying activities, functions, operations, etc. described herein may be stored on one or more external and/or internal computer-readable media. Additionally, such instructions may also, or alternatively, reside at least partially within a memory element (e.g., in main memory or cache memory of processor(s) 932 during execution, or within a non-volatile memory element(s) (e.g., one or more memory element(s) 933) of control system 930. Accordingly, other memory element(s) 933 of control system 930 may also constitute computer-readable media. As referred to herein in this Specification, the term 'computer-readable medium' is meant to include any non-transitory computer-readable storage medium (e.g., embedded logic provided in an application specific integrated circuit (ASIC), in digital signal processing (DSP) instructions, software [potentially inclusive of object code and source code], etc.) that is capable of storing instructions for execution by control system 930 (e.g., by one or more processor(s) 932) that causes the system to perform any of one or more of the activities, functions, operations, etc. disclosed herein.

In various embodiments, the at least one processor(s) 932 can execute instructions to perform operations to determine, adjust, etc. one of more of: an amount of T-component resin 924 to input to metered mixing system 904, an amount of R-component resin 926 to input to metered mixing system 904, flow rate(s) of a liquid foam mixture 908, temperature(s) of a liquid foam mixture 908, combinations thereof, or the like, in accordance with various embodiments.

Various communications between computing system 970 and control system 930 may occur across a network, such as network 940. Network 940 may represent any number and combination of wireline and/or wireless networks suitable for data transmission. Network 940 may, for example, communicate internet protocol packets, frame relay frames, asynchronous transfer mode cells, and/or other suitable data between network addresses. Network 940 may include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. Although the illustrated embodiment shows one network 940, teachings of certain embodiments recognize that more or fewer networks may be used and that not all elements may communicate via a network. Teachings of certain embodiments also recognize that communications over a network is one example of a mechanism for communicating between parties, and any suitable mechanism may be used.

In at least one embodiment, computing system 970 may include processor(s), memory element(s) I/O device(s), and buses. In other embodiments, computing system 970 may include more, less, or other components. Computing system 970 may be operable to perform one or more operations of various embodiments discussed herein. Although embodiments discussed herein provide one example of computing system 970 that may be used with other embodiments, such other embodiments may utilize computing systems other than computing system 970. Additionally, embodiments may also employ multiple computing systems 970 or other computing systems networked together in one or more public and/or private computer networks, such as one or more networks 940.

Users 980 may include any individual, group of individuals, entity, machine, and/or mechanism that interacts with control system 930 and/or computing system 970. Examples of users 980 may include, but are not limited to, a pilot, service person, engineer, technician, contractor, agent, human operator, and/or employee. Users 980 may be associated with an organization. An organization may include any social arrangement that pursues collective goals. One example of an organization is a business. A business is an organization designed to provide goods or services, or both, to consumers, governmental entities, and/or other businesses.

Referring to FIG. 9C, FIG. 9C is a simplified schematic diagram illustrating example details associated with filling a core area 712 of a given rotor blade 700 utilizing foam delivery system 900, in accordance with certain embodiments. One or more outgas openings 942 may be provided for the given rotor blade 700. In at least one embodiment, metered mixing system 904 (including hoses, etc.) may be inserted into the opening 732 (as shown in FIG. 7C) at the inboard end 701 of the rotor blade 700 to a distance associated with the span 730 of the given rotor blade 700 to provide a liquid foam mixture 908 within the core area 712. The given rotor blade 700 can be tilted along the inboard-outboard axis and/or the forward-aft axis (e.g., as discussed in FIG. 8C) for one or more tilt angles ($\alpha$) as the liquid foam mixture 908 is provided in the core area 712.

In at least one embodiment, the distance that the metered mixing system 904 may be inserted into the opening 732 may be located at a distance 734 along span 730 that may be associated with a volumetric split for the fixed volume of the core area 712. Once inserted to a given distance, foam delivery system 900 via metered mixing system 904 may provide the liquid foam mixture 908 in the hollow core area 712 by injecting (as generally shown by arrow 950) the liquid foam mixture 908 via one or more nozzle(s) 907. For embodiments in which the blade 700 is tilted downward along the inboard-outboard axis, gravity will pull the liquid foam mixture downward (as generally shown by arrow 951) toward the outboard end 702. The liquid foam mixture 908 polymerizes and expands to fill the core area 712 with a solid foam material 914. Liquid foam mixture 908 and/or expanding foam may be pushed upward (as generally illustrated by arrow 952) toward the inboard end 701 of rotor blade 700 to fill core area 712 with solid foam material 914. As the liquid foam mixture 908 is injected (950) the metered mixing system 904 may be removed (as generally shown by arrow 954) from the opening and/or the rotor blade 700 may be moved away (as generally shown by arrow 955) from the metered mixing system 904. In some embodiments, the rate at which the metered mixing system 904 is removed from the opening may be varied using one or more rates and/or the rate that the rotor blade 700 is moved away from the metered mixing system 904 may be varied using one or more rates. Foam delivery system 900 may stop the injecting once a prescribed amount of liquid foam mixture 908 has been provided in the core area.

In some embodiments, the location of metered mixing system 904 at distance 734 may be maintained for a period of time before it is moved outward from the core area (e.g., by moving one or both of the mixing system and/or the rotor blade). In still some embodiments, metered mixing system 904 may be inserted to a first distance (e.g., a distance 737) located proximate to the outboard end 702 of a given rotor blade 700 and moved outward toward the inboard end 701 of the rotor blade during the injecting. In still some embodiments, may be inserted to a first distance (e.g., a distance 737) located proximate to the outboard end 702 of a given rotor blade 700 and moved outward toward the inboard end 701 of the rotor blade during the injecting to one or more other distances (e.g., distances 736, 735, 734, 733, etc.). In some embodiments, moving the metered mixing system 904 to one or more distances may include holding its position at the one or more distances for one or more periods of time in which the periods of time may be the same or different. In some embodiments, the flow rate for the liquid foam mixture 908 may be varied using one or more flow rates during the injecting (950). In still some embodiments, the fixed volume of the hollow core area 712 may be calculated and may be sub-divided into a number of sub-volumes, in which case distance(s) at which the metered mixing system 904 may be provided may correspond to distance(s) along the span 730 relative to the volumetric split of each respective sub-volume. Other variations relating to injecting a liquid foam mixture in the core area of a rotor blade can be envisioned in accordance with embodiments described herein. Variations related to utilization of a foam delivery system 900 to inject a liquid foam mixture in a hollow core area of a rotor blade may be provided to attain a desired density and/or density variation of a solid foam material in the core area of a rotor blade in accordance with various embodiments.

In some embodiments, liquid foam mixture 908 may be heated or cooled during the injecting (950). In some embodiments, the tilt angle alpha ($\alpha$) of a given rotor blade along one or more axes may be varied during the injecting (950). In some embodiments, excess foam material that may have escaped from one or more outgas openings 942 during polymerization may be removed and the opening(s) may be sealed using known methods as would be appreciated by one of ordinary skill in the art.

In various embodiments, providing a liquid foam mixture in the hollow core area of a rotor blade using a foam delivery system and metered mixing system that is inserted through an opening at the inboard end of a rotor blade provides numerous advantages for manufacturing rotor blades. In particular, one advantage of embodiments described herein may include providing methods that may be repeatable and/or certifiable in order meet various quality control criteria for manufacturing many different blade types and/or styles for many different types of aircraft.

Referring to FIGS. 10A-10B, FIGS. 10A-10B are simplified diagrams illustrating example details that may be associated with another example rotor blade 1000 in which the rotor blade has a core area 1012 that can be filled with a foam material, in accordance with certain embodiments. FIG. 10A is a simplified perspective view diagram illustrating example details that may be associated with a rotor blade 1000, in accordance with certain embodiments. FIG. 10B is a simplified perspective view of a portion of rotor blade 1000. Rotor blade may include an inboard end 1001, an outboard end 1002, a leading edge 1003, a trailing edge 1004, and a hollow core area 1012. In some embodiments, core area 1012 may be open at the inboard end 1001; however, in some embodiments, core area 1012 may be closed at the inboard end 1001.

In some embodiments, one or more port(s) 1060 may be provided for one or more opening(s) 1042 provided along a span 1030 of rotor blade 1000. In various embodiments, openings 1042 may include one or more outgas opening(s) 1042b provided in the upper skin of the rotor blade 1000 and one or more injection opening(s) 1042a provided along the trailing edge 1004 of the rotor blade 1000 in which a port 1060 may be provided for each injection opening 1042a. In some embodiments, outgassing may also be provided via opening(s) 1042a and port(s) 1060.

Port(s) 1060 may be configured to attach a hose from a foam delivery system (e.g., a foam delivery system 1100, as discussed in FIGS. 11A-11C) in order to inject a liquid foam mixture into the core area 1012. Thus, port(s) 1060 may include any structural features that may facilitate connecting and disconnecting a hose thereto. In at least one embodiment, opening(s) 1042a may be provided via the trailing edge wedge (not labeled) for the rotor blade 1000 and the upper and/or lower skins (not labeled) may have portions removed (before or after bonding) that exposes the openings 1042a. In at least one embodiment, port(s) 1060 may be configured to be removable following injection of a liquid foam mixture in the core area and the portions of the upper and/or lower skins may be patched or otherwise repaired, as would be appreciated by one of ordinary skill in the art.

In some embodiments, an opening 1042a and port 1060 may be provided at distance (e.g., a distance 1034) along the span 1030 that may be associated with a volumetric split for the fixed volume of the core area 1012. Although one opening/port 1042a/1060 is illustrated in FIGS. 10A-10B, it is to be understood that any number of openings/ports may be provided in order to inject a liquid foam mixture at any station along the span 1030 of a given rotor blade. For example, in some embodiments, the fixed volume of the hollow core area 1012 of a given rotor blade may be calculated and may be sub-divided into a number of respective sub-volumes, in which case a respective opening/port 1042a/1060 may be provided at a respective distance along the span 1030 relative to the volumetric split of each respective sub-volume. Other variations relating to opening/port location, injection process(es), etc. can be envisioned in various embodiments. For example, in some embodiments, port(s) may be provided along the upper and/or lower skin(s) of a given rotor blade in addition to or in lieu of providing port(s) along the trailing edge of the blade. Variations (e.g., temperature, tilting, etc.) related to utilization of a foam delivery system 1100 to inject a liquid foam mixture in a hollow core area of a rotor blade may be provided to attain a desired density and/or density variation of a solid foam material in the core area of a rotor blade in accordance with embodiments described herein.

Referring to FIGS. 11A-11C, in some embodiments, a liquid foam mixture may be provided in the core area 1012 of a given rotor blade 1000 using a foam delivery system 1100. FIG. 11A is a simplified schematic diagram illustrating details that may be associated with foam delivery system 1100, in accordance with certain embodiments. In at least one embodiment, foam delivery system 1100 may include a motor 1101, a metered mixing system 1104, a first pump 1110 and a first reservoir 1111, a second pump 1120 and a second reservoir 1121, and a control system 1130. In at least one embodiment, metered mixing system 1104 may include a housing 1105 in which a spiral auger or worm gear 1106 may be provided that may be connected to a rotating shaft 1103 (within a protective covering 1102) that may be in mechanical communication with motor 1101. The metered mixing system 1104 may further include one or more hose(s) 1107 in which each respective hose 1107 may include a respective attachment fitting 1109. In some embodiments, attachment fitting(s) 1109 may be configured to be connected and disconnected from port(s) 1060 provided for a given rotor blade 1000; however, in other embodiments, attachment fittings 1109 may be configured to be inserted in openings provided for a given rotor blade without the use of ports provided for the given rotor blade.

In at least one embodiment, control system 1130 may be in communication with motor 1101, first pump 1110, second pump 1120, and metered mixing system 1104 via communication links 1131, which may enable electronic communications between the components. In at least one embodiment, control system 1130 may be in communication with a computing system 1170 via a network 1140. Also shown in FIG. 11A is a user 1180.

In various embodiments, communication links 1131 can include wired (e.g., serial, parallel, Ethernet, etc.) and/or wireless (e.g., Bluetooth™, WiFi, etc.) communication links. In various embodiments, foam delivery system 1100 may also include various sensors (e.g., pressure, flow rate, temperature, etc.), valves, heating elements, cooling elements, combinations thereof, or the like, which are not shown but would be appreciated by one of ordinary skill in the art to facilitate various features described herein. Various hoses interconnecting components of foam delivery system 1100 are not labeled for sake of brevity.

In at least one embodiment, foam delivery system 1100 may provide for mixing together a prescribed amount of a T-component resin 1124 and an R-component resin 1126 to form a liquid foam mixture 1108 that may be injected into a hollow core area 1012 of a given rotor blade 1000. During operation, for example, pump 1110 may pump T-component resin 1124 from first reservoir 1111 into metered mixing system 1104. Pump 1120 may pump R-component resin 1126 from second reservoir 1121 into metered mixing system 1104. Auger 1106 may be rotated via motor 1101 and shaft 1103 at a given rotations per minute to mix T-component resin 1124 and R-component resin 1126 to form liquid foam mixture 1108 within housing 1105 and push the liquid foam mixture through nozzle(s) 1107.

Control system 1130 may control the amount of T-component resin 1124 and R-component resin 1126 that are pumped into metered mixing system 1104. For example, in at least one embodiment, in-line valves (not shown) for hoses connected to housing 1105 may be selectively opened and closed to control the amount of resin input to metered mixing system 904. Components of foam delivery system 904 may have any suitable dimensions.

In general, features and/or operations that may be performed by foam delivery system 1100 may be similar to features and/or operations that may be provided by foam delivery system 900; however, metered mixing system 1104 may inject a liquid foam mixture 1108 into the core area of a given blade via one or more hoses 1107 using one or more openings and/or ports provided for the blade rather than being inserted in the hollow core area of a given rotor blade as discussed for metered mixing system 904.

Referring to FIG. 11B, FIG. 11B is a simplified block diagram illustrating example details that may be associated with control system 1130. In at least one embodiment, control system 1130 may include at least one processor(s) 1132, at least one memory element(s) 1133, I/O device(s) 1134, and a bus 1135. In various embodiments, at least one processor(s) 932 may have any features of any other processors (e.g., processor(s) 932) discussed herein; at least one memory element(s) 1133 may have any features of any other memory element(s) (e.g., memory element(s) 1134) discussed herein; I/O device(s) 1134 may have any features of any other I/O devices (e.g., I/O device(s) 934) discussed herein; and/or bus 1135 may have any feature(s) of any other buses (e.g., bus 935) discussed herein.

In various embodiments, the at least one processor(s) 1132 can execute instructions to perform operations to determine one of more of: an amount of T-component resin 1124 to input to metered mixing system 1104, an amount of R-component resin 1126 to input to metered mixing system 1104, flow rate(s) of a liquid foam mixture 1108, combinations thereof, or the like, in accordance with various embodiments.

Various communications between computing system 1170 and control system 1130 may occur across a network, such as network 1140. In various embodiments, computing system 1170 may have any features of any other computing systems (e.g., computing system 930) discussed herein; network 1140 may have any features of any other network (e.g., network 940) discussed herein; and users 1180 may have any other features of any other users (e.g., users 980) discussed herein.

Referring to FIG. 11C, FIG. 11C is a simplified schematic diagram illustrating example details associated with filling a core area 1012 of a given rotor blade 1000 utilizing foam delivery system 1100, in accordance with certain embodiments. One or more outgas opening(s) 1042b and one or more respective injection opening(s) 1042a and respective port(s) 1060 may be provided for the given rotor blade 1000. In at least one embodiment, a hose 1107 of metered mixing system 1100 may be connected to a given port 1060 of rotor blade 1000 via an attachment fitting 1109 of the hose 1107 to provide a liquid foam mixture 1108 within the core area 1012. In some embodiments, port(s) 1060 and attachment fitting(s) 1109 may be configured as cam-and-groove couplings to provide a quick disconnect system for connecting and disconnecting hose(s) 1107 from port(s); however, in other embodiments, port(s) 1060 and attachment fitting(s) 1109 may be configured with any suitable features to facilitate connections. The given rotor blade 1000 can be tilted along the inboard-outboard axis and/or the forward-aft axis (e.g., as discussed in FIG. 8C) for one or more tilt angles ($\alpha$) as the liquid foam mixture 1008 is provided in the core area 1012.

As illustrated in the embodiment of FIG. 11C, foam delivery system 1100 via metered mixing system 1104 may provide the liquid foam mixture 1108 in the core area 1012 by injecting (as generally shown by arrow 1150) the liquid foam mixture 1108 via one or more hose(s) 1107 connected to one or more port(s) 1060 of rotor blade 1000. For embodiments in which the blade 1000 is tilted downward along the inboard-outboard axis, gravity will pull the liquid foam mixture downward (as generally shown by arrow 1151) toward the outboard end 1002. The liquid foam mixture 1008 polymerizes and expands to fill the core area 1012 with a solid foam material 1114. Liquid foam mixture 1108 and/or expanding foam may be pushed upward (as generally illustrated by arrow 1152) toward the inboard end 1001 of rotor blade 1000 to fill core area 1012 with solid foam material 1114. Foam delivery system 900 may stop the injecting once a prescribed amount of liquid foam mixture 1008 has been provided in the core area. In at least one embodiment, hose(s) 1107 may be disconnected from port(s) 1060 to allow outgassing for the expanding foam.

In some embodiments, liquid foam mixture 1108 may be heated or cooled during the injecting (1150). In some embodiments, the tilt angle alpha ($\alpha$) of a given rotor blade along one or more axes may be varied during the injecting (1150). In some embodiments, excess foam material that may have escaped from one or more outgas openings 1002b and/or port(s) 1060 during polymerization may be removed and the opening(s) may be sealed using known methods as would be appreciated by one of ordinary skill in the art. In at least one embodiment, port(s) 1060 may be removed and corresponding portions of the upper and lower skin at the location(s) of the port(s) may be patched or otherwise repaired along the trailing edge 1004 of the rotor blade.

Although ports and attachment fittings are described as a means for connecting hoses of metered mixing system 1100 to openings of a given rotor blade, it should be appreciated that any means may be used to connect hoses to one or more openings of a rotor blade. For example, in some embodiments, any combination and/or number of hose(s) 1107 may be configured with elastomeric fittings, spring-loaded clips, or the like that may be inserted into opening(s) and/or coupled to port(s) that may be provided anywhere proximate to the hollow core area of a rotor blade (e.g., in the upper skin, the lower skin, along the trailing edge, through the aft wall of the spar, etc.) to inject a liquid foam mixture into the core area and then removed to allow outgassing. The examples discussed herein are only a few of the many possible means that may be used for providing a liquid foam mixture in a hollow core area of a rotor blade and are not meant to limit the broad scope of the present disclosure. Virtually any other connections may be used using similar means and methods as those described herein and, thus, are clearly within the scope of the present disclosure.

In various embodiments, providing a liquid foam mixture in the hollow core area of a rotor blade using a foam delivery system and metered mixing system that is connected to opening(s) of a rotor blade provides numerous advantages for manufacturing rotor blades. In particular, one advantage of embodiments described herein may include providing methods that may be repeatable and/or certifiable in order meet various quality control criteria for manufacturing many different blade types and/or styles for many different types of aircraft.

Referring to FIG. 12, FIG. 12 is a simplified flowchart 1200 illustrating example details that may be associated with filling a hollow core area of a given rotor blade with a solid foam material using a liquid foam mixture provided in the core area of the rotor blade using a foam delivery system inserted through an opening at an inboard end of the rotor blade, in accordance with certain embodiments. In at least one embodiment, flowchart 1200 may begin at block 1202 by providing one or more outgas openings for the hollow core area of the rotor blade. The flowchart may proceed to 1204 by positioning one or more nozzle(s) (e.g., via a metered mixing system) within the hollow core area at a distance associated with a span of the rotor blade (e.g., a station along the span). The flowchart may proceed to 1206 by providing a liquid foam mixture in the hollow core area in which the liquid foam mixture expands and becomes a solid foam material that fills the hollow core area of the rotor blade. The flowchart may proceed to 1208 by moving the nozzle(s) and/or the rotor blade to remove the nozzle(s) from the core area as the liquid foam mixture is provided in the core area. The flowchart may proceed to 1210 by curing the solid foam material. The flowchart may proceed to 1212 by sealing the outgas opening(s). It is to be understood that different variations may be provided for the flowchart 1200 in accordance with various embodiments described herein (e.g., positioning the nozzle(s) at different distance(s), heating/cooling the liquid foam mixture, adjusting the flow rate of the liquid foam mixture, tilting the rotor blade, etc.). In at least one embodiment, the flowchart may be completed following the curing at 1210. In some embodiments, however, the flowchart may restart and/or certain blocks may be repeated.

Referring to FIG. 13, FIG. 13 is a simplified flowchart 1300 illustrating example details that may be associated with filling a hollow core area of a given rotor blade with a solid foam material using a liquid foam mixture that may be provided in the core area through one or more openings of the rotor blade, in accordance with certain embodiments. In at least one embodiment, the flowchart 1300 may begin at 1302 by providing a plurality of openings for the hollow core area of the rotor blade. In some embodiments, the openings may be outgas openings. In some embodiments, the openings may be pour openings. In still some embodiments, the openings may be injection openings in which a port may be configured for each injection opening. In still some embodiments, the openings may be injection openings in which no port may be configured for each opening. In still some embodiments, at least one of the openings may be an opening at the inboard end of the rotor blade.

The flowchart may proceed to 1304 by providing a liquid foam mixture in the hollow core area of the rotor blade through at least one opening of the plurality of openings in which the liquid foam mixture expands and becomes a solid foam material that fills the hollow portion of the rotor blade. It is to be understood that different variations may be provided for the flowchart 1300 in accordance with various embodiments described herein (e.g., heating/cooling the liquid foam mixture, adjusting the flow rate of the liquid foam mixture, tilting the rotor blade, etc.).

The flowchart may proceed to 1306 by curing the solid foam material. The flowchart may proceed to 1308 by sealing the plurality of openings provided for the rotor blade. In at least one embodiment, the flowchart may be completed following the curing at 1308. In some embodiments, however, the flowchart may restart and/or certain blocks may be repeated.

The flowcharts and diagrams in the FIGURES illustrate the architecture, functionality, and operation of possible implementations of various embodiments of the present disclosure. It should also be noted that, in some alternative implementations, the function(s) associated with a particular block may occur out of the order specified in the FIGURES. For example, two blocks shown in succession may, in fact, be executed substantially concurrently, or the blocks may sometimes be executed in the reverse order or alternative orders, depending upon the functionality involved.

Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments.

As used herein, unless expressly stated to the contrary, use of the phrase 'at least one of', 'one or more of' and 'and/or' are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. As referred to herein, 'at least one of', 'one or more of', and the like can be represented using the '(s)' nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   positioning at least one nozzle within a hollow portion of a rotor blade at a distance associated with a span of the rotor blade, wherein the hollow portion of the rotor blade has a fixed volume between an outboard end and an inboard end of the rotor blade; and
   providing, via the at least one nozzle, a liquid foam mixture in the hollow portion, wherein the liquid foam expands and becomes a solid foam material that fills the hollow portion of the rotor blade;
   wherein the hollow portion of the rotor blade is defined, at least in part, by an aft wall of a spar of the rotor blade, at least a portion of an inner surface of an upper skin of the rotor blade, at least a portion of an inner surface of a lower skin of the rotor blade, and a forward wall of a trailing edge wedge of the rotor blade for the span of the rotor blade.

2. The method of claim 1, wherein the distance is based, at least in part, on a center of the fixed volume of the hollow portion of the rotor blade.

3. The method of claim 1, wherein providing the liquid foam mixture in the hollow portion further comprises at least one of:
   moving the rotor blade away from the at least one nozzle at one or more rates as the liquid foam mixture is provided in the hollow portion of the rotor blade;
   removing the at least one nozzle from the hollow portion at one or more rates as the liquid foam mixture is provided in the hollow portion of the rotor blade;
   adjusting a flow rate that the liquid foam mixture is provided in the hollow portion of the rotor blade;
   tilting the rotor blade along an inboard-outboard axis as the liquid foam mixture is provided in the hollow portion of the rotor blade; and
   tilting the rotor blade along a forward-aft axis during as the liquid foam mixture is provided in the hollow portion of the rotor blade.

4. The method of claim 3, wherein tilting the rotor blade along the inboard-outboard axis includes tilting the outboard end of the rotor blade downward between 15 degrees and 75 degrees.

5. The method of claim 3, wherein tilting the rotor blade along the forward-aft axis includes tilting a leading edge of the rotor blade downward between 15 degrees and 75 degrees.

6. The method of claim 3, further comprising one of:
   heating the liquid foam mixture; and
   cooling the liquid foam mixture.

7. The method of claim 6, wherein heating the liquid foam mixture includes heating the liquid foam mixture to a temperature greater than 100 degrees Fahrenheit.

8. The method of claim 6, wherein cooling the liquid foam mixture includes cooling the liquid foam mixture to a temperature less than 70 degrees Fahrenheit.

9. The method of claim 1, wherein the distance is one of a plurality of distances associated with the span of the rotor blade, and providing the liquid foam mixture further comprises:
   providing the liquid foam mixture in the hollow portion between the outboard end and the inboard end of the rotor blade at each distance of the plurality of distances, wherein the position of the at least one nozzle at each distance is maintained for a period of time and wherein the period of time at each distance is the same or different.

10. The method of claim 1, further comprising:
    providing at least one opening for the hollow portion of the rotor blade to allow outgassing as the liquid foam mixture expands and becomes the solid foam material.

11. The method of claim 1, wherein the solid foam material adheres to an upper skin of the rotor blade, a lower skin of the rotor blade, a spar of the rotor blade, and a trailing edge wedge of the rotor blade.

12. A method comprising:
    providing a plurality of openings for a rotor blade, wherein the plurality of openings are positioned proximate to a hollow portion of the rotor blade, and the hollow portion of the rotor blade has a fixed volume between an outboard end and an inboard end of the rotor blade; and providing a liquid foam mixture in the hollow portion of the rotor blade through at least one opening of the plurality of openings of the rotor blade, wherein the liquid foam mixture expands and becomes a solid foam material that fills the hollow portion of the rotor blade;

wherein the at least one opening of the plurality of openings has an inboard-outboard diameter and a forward-aft diameter, and the inboard-outboard diameter and the forward-aft diameter are different.

13. The method of claim 12, wherein providing the liquid foam mixture in the hollow portion of the rotor blade further comprises:

pouring the liquid foam mixture into the hollow portion using at least one opening of the plurality of openings.

14. The method of claim 12, wherein the liquid foam mixture is provided into the hollow portion of the rotor blade at a particular opening located at a distance that is based, at least in part, on a center of the fixed volume of the hollow portion rotor blade between the outboard end and the inboard end of the rotor blade.

15. The method of claim 12, wherein the fixed volume of the rotor blade comprises a plurality of sub-volumes and the liquid foam mixture is provided into the hollow portion of the rotor blade at a plurality of openings, wherein each opening is located at a distance that is based, at least in part, on a center of each sub-volume.

16. The method of claim 12, wherein providing the liquid foam mixture in the hollow portion further comprises at least one of:

tilting the rotor blade along an inboard-outboard axis as the liquid foam mixture is provided in the hollow portion of the rotor blade; and tilting the rotor blade along a forward-aft axis during as the liquid foam mixture is provided in the hollow portion of the rotor blade.

17. The method of claim 12, wherein providing the liquid foam mixture in the hollow portion further comprises:

injecting the liquid foam mixture through at least one opening of the plurality of openings using a foam delivery system, wherein the liquid foam mixture is injected through the at least one opening at one or more flow rates.

18. The method of claim 17, wherein the at least one opening is located at one of:

an inboard end of the rotor blade;
an upper skin of the rotor blade;
a lower skin of the rotor blade; and
a trailing edge of the rotor blade.

19. The method of claim 17, further comprising at least one of:

tilting the rotor blade along an inboard-outboard axis as the liquid foam mixture is injected; and tilting the rotor blade along a forward-aft axis during as the liquid foam mixture is injected.

20. The method of claim 19, further comprising one of:

heating the liquid foam mixture prior to the injecting; and
cooling the liquid foam mixture prior to the injecting.

21. The method of claim 12, wherein providing at least one opening of the plurality of openings allows outgassing as the liquid foam mixture expands and becomes the solid foam material.

22. The method of claim 12, wherein:

at least one opening is provided through a skin of the rotor blade; and at least one opening is provided through a trailing edge of the rotor blade.

23. The method of claim 12, further comprising:

sealing the plurality of openings of the rotor blade after the liquid foam mixture expands and becomes the solid foam material.

24. The method of claim 23, wherein the plurality of openings are sealed using a composite material.

25. The method of claim 12, wherein the hollow portion of the rotor blade is defined, at least in part, by an aft wall of a spar of the rotor blade, at least a portion of an inner surface of an upper skin of the rotor blade, at least a portion of an inner surface of a lower skin of the rotor blade, and a forward wall of a trailing edge wedge of the rotor blade for a span of the rotor blade.

26. The method of claim 12, wherein the solid foam material adheres to an upper skin of the rotor blade, a lower skin of the rotor blade, a spar of the rotor blade, and a trailing edge wedge of the rotor blade.

* * * * *